US012067959B1

(12) United States Patent
Goswami et al.

(10) Patent No.: US 12,067,959 B1
(45) Date of Patent: Aug. 20, 2024

(54) PARTIAL RENDERING AND TEARING AVOIDANCE

(71) Applicant: Meta Platforms Technologies, LLC, Menlo Park, CA (US)

(72) Inventors: Nilanjan Goswami, Livermore, CA (US); Hideo Tamama, Kirkland, WA (US); Christopher James Goodman, Round Rock, TX (US); Steve John Clohset, San Francisco, CA (US); Shanmathi Natarajan, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/172,613

(22) Filed: Feb. 22, 2023

(51) Int. Cl.
*G09G 5/18* (2006.01)

(52) U.S. Cl.
CPC ........... *G09G 5/18* (2013.01); *G09G 2310/04* (2013.01)

(58) Field of Classification Search
CPC ............................. G09G 5/18; G09G 2310/04
See application file for complete search history.

(56) References Cited

U.S. PATENT DOCUMENTS 6,466,217 B1 * 10/2002 Hsieh .................... G06T 15/005 345/503
10,412,320 B1 * 9/2019 Kumar .................. H04N 5/268
2012/0108330 A1 * 5/2012 Dietrich, Jr. ......... H04N 21/235 463/31
2014/0125685 A1 * 5/2014 Yeh ........................ G09G 5/399 345/545
2014/0184629 A1 * 7/2014 Wyatt .................... G09G 5/395 345/547
2014/0267335 A1 * 9/2014 Stoye .................... G06F 3/1438 345/545
2014/0307168 A1 * 10/2014 Law ......................... G09G 5/12 348/500
2015/0035853 A1 * 2/2015 Kaburlasos ............... G06T 1/60 345/619
2015/0264298 A1 * 9/2015 Colenbrander ........ G09G 5/001 345/547
2016/0196801 A1 * 7/2016 Glen ...................... G09G 5/003 345/213
2017/0193971 A1 * 7/2017 Bi ............................ G09G 5/18
2018/0091860 A1 * 3/2018 Stokking ............ H04N 21/4728
2018/0167627 A1 * 6/2018 McGowan ........... H04N 19/423
2018/0197269 A1 * 7/2018 Broadhurst ............. G06F 9/505
2019/0164518 A1 * 5/2019 Dimitrov ............... G09G 5/393
2019/0392546 A1 * 12/2019 Flordal ..................... G06T 1/60
(Continued)

*Primary Examiner* — Ibrahim A Khan
(74) *Attorney, Agent, or Firm* — Morgan, Lewis & Bockius LLP

(57) ABSTRACT

A method is disclosed for receiving a synchronization signal from a display circuit configured to display a series of frames, each frame comprising a plurality of tiles of pixels, determining, based on the received synchronization signal, that the display circuit has consumed data corresponding to one or more tiles of a frame, identifying a predetermined number of tiles that are subsequent to the one or more tiles consumed by the display circuit based on the synchronization signal, determining that one or more tiles of the identified tiles require an update, selectively rendering the determined tiles, and transmitting the rendered tiles to the display circuit.

20 Claims, 30 Drawing Sheets

(56) References Cited

U.S. PATENT DOCUMENTS

| | | | | |
|---|---|---|---|---|
| 2020/0135075 | A1 * | 4/2020 | Cook | G09G 3/007 |
| 2020/0219430 | A1 * | 7/2020 | Malnar | G09G 5/393 |
| 2020/0335062 | A1 * | 10/2020 | Huard | G09G 5/18 |
| 2021/0065652 | A1 * | 3/2021 | Han | G09G 5/12 |

* cited by examiner

1500

2000

2200

PARTIAL RENDERING AND TEARING AVOIDANCE

TECHNICAL FIELD

This disclosure generally relates to a hardware architecture of a processor unit for rendering 2D content.

BACKGROUND

Text is a crucial component of 3-D environments and virtual worlds for user interfaces and wayfinding. Implementing text using standard antialiased texture mapping leads to blurry and illegible writing which hinders usability and navigation. While supersampling removes some of these artifacts, distracting artifacts can still impede legibility, especially for recent high-resolution head-mounted displays. There is a need for an analytic antialiasing technique that efficiently computes the coverage of text glyphs, over pixel footprints, designed to run at real-time rates and an ability to decomposes glyphs into piecewise-biquadratics and trapezoids that can be quickly area-integrated over a pixel footprint to provide crisp legible antialiased text, even when mapped onto an arbitrary surface in a 3-D virtual environment.

SUMMARY OF PARTICULAR EMBODIMENTS

Figure 1A:
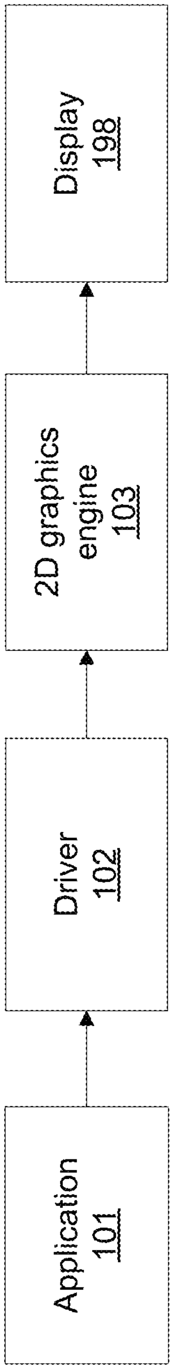
FIG. 1A illustrates an example diagram of a 2D graphics system.

This invention is directed to an architecture of a 2D graphics engine (e.g., graphics processing unit, GPU) that is configured to render high-quality graphics while operating on an ultra-low power budget. Particular embodiments disclosed herein provide an improved technique for anti-aliasing. Anti-aliasing could be done in a variety of ways. Traditionally, anti-aliasing is achieved using Multi-Sample Anti-Aliasing (MSAA), which samples multiple points within a pixel area to determine what color the pixel should display. A more accurate anti-aliasing could be achieved with more sampling points, but sampling is computationally expensive. Instead of sampling, this invention converts 2D content definitions into primitive shapes (e.g., 2D horizontally-aligned trapezoids and quadratic curves) and leverages the known geometric properties of the primitives to perform analytic anti-aliasing (e.g., instead of sampling a pixel at multiple points, embodiments disclosed herein use geometry to compute how pixels/tiles are covered by the primitives). For example, the technique involves calculating the amount of pixel that is covered by a primitive (e.g., 11% of the pixel is covered by a trapezoid), then rendering the pixel shading based on thereof. This technique allows the rendering of high-quality images at low power.

In particular embodiments, a graphics engine performs anti-aliasing tile-by-tile. A scene may be broken down into individual tiles, each tile comprising a fixed number of pixels such as 32×32 pixels. For each tile, a "shape walker" component of the graphics engine determines evaluates the pixels within the tile and determines whether the pixels are completely inside, completely outside, or partially inside and partially outside a primitive that is covered in the tile. Pixels that are completely inside or completely outside the primitive do not need anti-aliasing, whereas pixels that intersect or overlap with an edge of the primitive (e.g., outer frame of the primitive) would need to be sent to the "integrator," where more fine-grained pixel-level analytic anti-aliasing is needed. Particular embodiments disclosed herein provide a novel technique for achieving such tasks.

In particular embodiments, 2D scene that is to be rendered is divided into tiles, each tile having a pre-determined number of pixels (e.g., 16×16). Text and 2D content within the scene is defined as paths or contours, which is then converted into shapes of axis-aligned trapezoid or piece-wise-biquadratic (simply quadratics) curves. These shapes are referenced as primitives. Then, for each tile, XRU-2D identifies the smallest bounding box within a tile that encompasses a portion of a primitive covered by the tile. Each row of pixels within the bounding box is then traversed row-by-row to determine pixels that overlap with the outer shape of the primitive. Once the overlapping pixels are identified, pixels that do not need to be anti-aliased are identified. The overlapping pixels are then sent to the integrator, while other pixels (pixels falling outside the primitive or fully inside the primitive) are assigned 0 and 1 weight values, respectively, and sent to a different process (not to an integrator). Subsequent steps involve, the integrator figuring out the coverage weight of the overlapping pixels against the primitive, which may be used to determine the pixel shading for anti-aliasing.

In particular embodiments, the technique of identifying the overlapping pixels discussed above involves one of two variations depending on whether the primitive is an axis-aligned trapezoid or a piecewise-biquadratic (simply quadratics) curve. If the primitive is a trapezoid, the method involves identifying the maximum and minimum Y values of the trapezoid (e.g., top and bottom size of the trapezoid) and Y-intercepts and slope of an edge (or both edges if two sides of the trapezoid fits into one tile). Then, the method continues by traversing row-by-row to identify, based on the slopes and Y-intercepts identified in the previous step, pixels that are overlapping with the shape of the trapezoid. Then, the overlapping pixels are sent to the integrator, and pixels that fall outside of the trapezoid are assigned weight 0 and pixels that fall inside the trapezoid are assigned weight 1. If the primitive is a curve, the same high-level steps of identifying overlapping pixels and applying weights to non-overlapping pixels are used, but in contrast to if the primitive is a trapezoid, quadratic formula is used to represent the curve rather than using Y-intercepts and slope.

In particular embodiments, a technique is disclosed for optimization of a graphics engine architecture by selectively rendering and updating portions of a display that needs to be updated. Conventional graphics pipeline utilizes a frame buffer where a rendered frame is stored until the graphics engine determines that the frame should be sent out to the display driver integrated circuit (DDIC). Embodiment disclosed herein removes the use of a frame buffer (e.g., in the DDR memory) along with the decision logic that takes place in the graphics engine that determines when the rendered frames should be sent out to the DDIC. Instead, the frame buffer is replaced with a small on-chip buffer (e.g., 2 tiles worth, not a full frame buffer). This way, the graphics pipeline can be shortened, which allows a reduction in power consumption. Without the frame buffer acting as an intermediary between the graphics engine and the DDIC, the rendered frames are sent directly by the graphics engine to the display buffer of the DDIC. This scheme, however, present a problem because the DDIC reads the rendered frames from the display buffer at a particular speed without regard to some decision logic. In other words, the DDIC lacks the capability of checking whether the frames in the display buffer have been already read/processed, meaning, if the graphics engine updates the display buffer too quickly, some of the rendered frame may be overwritten prematurely (e.g., before being read), resulting in tearing artifacts. To address this problem, embodiments herein presents a novel way of throttling the updating of the display frames, where the throttling decision logic is executed by the graphics engine that has the capability of directly updating the display buffer.

In one aspect, the graphics engine will not run and render content until it knows that the new content has been readout by the display buffer (i.e., the buffer in the display). The graphics engine uses the display's V/H sync signals to determine when a tile in the display buffer has been consumed. Horizontal Synchronization, or Hsync is a signal that is used to synchronize the start of the horizontal line scan of a frame with the graphics engine that rendered the frame. Vertical Synchronization, or Vsync, is similar to Hsync but is used to synchronize the start of the horizontal line scan of the next frame with the graphics engine that rendered the frame. The graphics engine herein uses such V/H sync signals to delay the rendering process until the display has had an opportunity to read the rendered frames, effectively throttling the rendering process to mitigate the premature overwriting of the rendered data. For example, if tile in the display buffer has not been read out (as determined by the V/H sync signals), the graphics engine will not flush its small buffer into the display buffer, and the graphics engine's compute logic will not run and render new content if its small on-chip buffer hasn't been flushed. If tile in the display buffer has been read, then the graphics engine will flush its small buffer and the graphics engine will render the next content since the small buffer is available.

In particular embodiments, the graphics engine determines which tiles to selectively render based on differential changes of content across the frames. The graphics engine maintains tile information of each of the tiles in a frame, which can be used to track primitives. And thus, for example, if the graphics engine determines that a new primitive was introduced in a frame, the graphics engine can select tiles that are covering the new primitive and render only those tiles and not the rest of the tiles in a frame.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

FIG. 1A illustrates an example diagram of a 2D graphics system according to embodiments disclosed herein. Such embodiments may include an application 101 that provides scene details, a driver 102 that converts paths within a scene into shapes that can be more efficiently processed (referred herein as "primitives"), a 2D graphics engine 103 for rendering a scene, and a display 198 for displaying the rendered scene. A 2D graphics engine 103 may be referred herein as a graphics engine, graphics system, GPU, or simply a "system" for brevity.

In particular embodiments, a driver 102 may be configured to decompose a scene received from an application 101 into individual shapes that can be more efficiently processed by a 2D graphics engine 103, such shapes are referred herein as "primitives." A scene may consist of a number of 2D content and texts. 2D content and texts contained in a scene may be defined by "paths," where each path is made up of lines, curves, arcs, or otherwise referred herein as "contours." In an embodiment, an application 101 defines the paths within a scene. For example without limitation, a typical scene may contain between 2,000-20,000 paths. In an embodiment, each contour may be required to be "closed," such that the first and last vertices of the contour are identical (e.g., at the same location). In an embodiment, a driver 102 may be configured to process each path in a scene by converting the contours of the path into one of two types of primitives: (1) horizontally aligned trapezoids and (2) piecewise-biquadratic curves. A horizontally aligned trapezoid, referred hereinafter as a "trapezoid" for brevity, comprises two parallel horizontal edges on the top and bottom sides of the trapezoid and two side edges connecting the top and bottom sides. A piecewise-biquadratic curve-referred hereinafter as a "quadratic curve" for brevity—is a 2-D region bounded by a quadratic curve and a line. An example process of converting the contours of a path into primitives is disclosed in the following paper: A. Ellis, W. Hunt, J. Hart, Nerf: *Real-Time Analytic Antialiased Text for* 3-*D) Environments*, Computer Graphics forum, vol. 38, issue Nov. 8, 2019, pp. 23-32.

In particular embodiments, a driver 102 may be configured to perform tiling operations by which a scene is segmented into a smaller data structure called a tile, or tile block. Each tile may be composed of a set of pixels. For example, a tile may be comprised of a 16-by-16 pixel block or a 32-by-32 pixel block. In an embodiment, a driver 102 may be configured to determine, for each tile in a scene, every primitive that is covered the tile, then store this information in a memory database 109 that is accessible by a graphics engine 103.

While recognizing the differences of terms "pixels" and "texels" as used in the field of art, any references to pixels herein may be interchangeable with references to texels and any references to texels herein may be interchangeable with references to pixels, for the purposes of describing the embodiments herein.

Figure 1B:
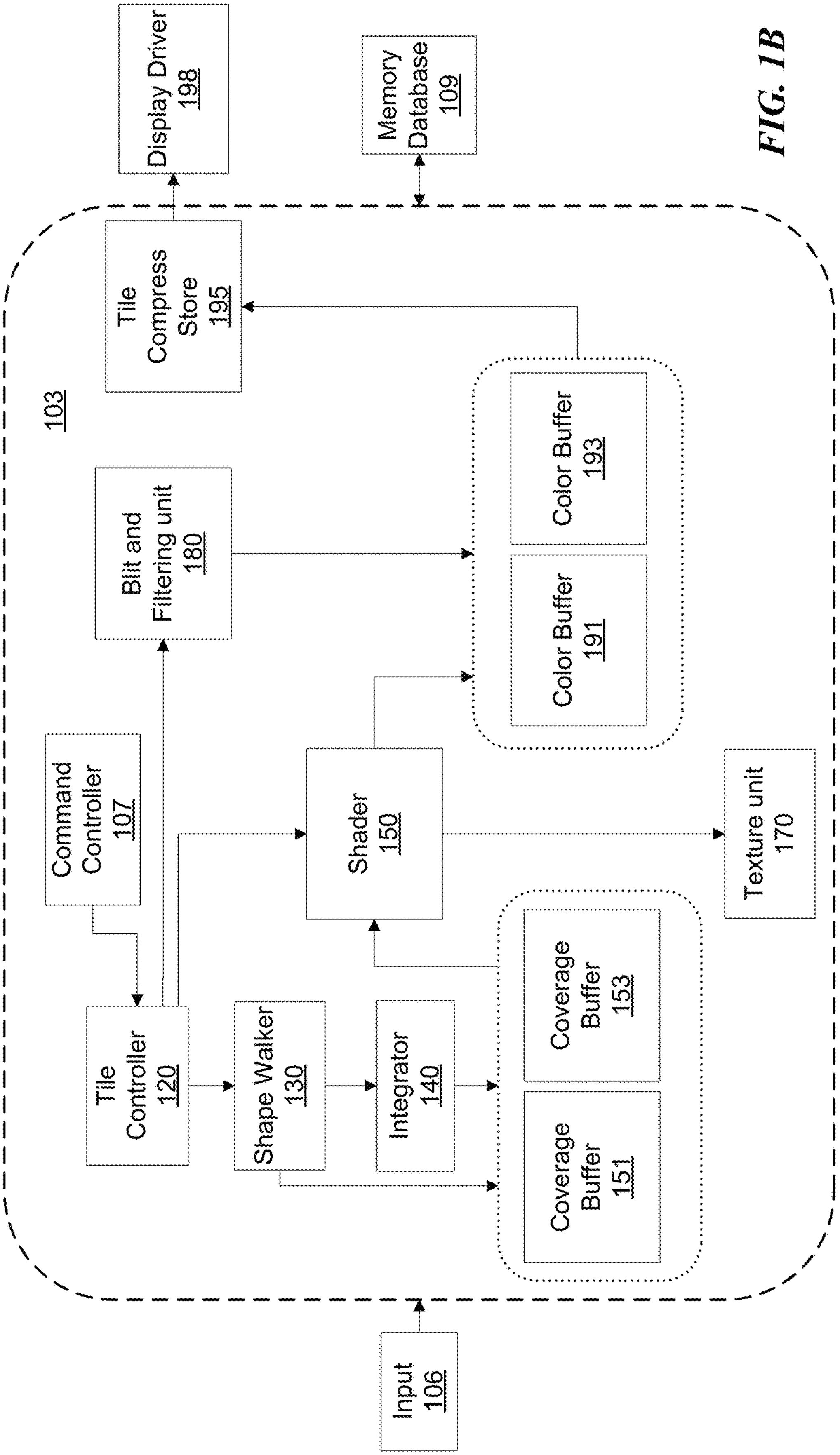
FIG. 1B illustrates an example of a graphics engine

FIG. 1B illustrates an example of a graphics engine 103. In particular embodiments, a 2D graphics engine 103 may be configured to perform rendering operations tile by tile or a single tile at a time. In other embodiments, a graphics engine 103 may perform certain rendering operations multiple tiles at a time or in parallel. A command controller 107 may be configured to arrange the tiles within a scene in a specific order and provide instructions to a tile controller 120 to start rendering the tiles according to the tile order. For example, a command controller 107 may be configured to implement a tile walking function that iterates over the tile data structure to determine information about the tile. Such tile information may include which tiles should be processed by the downstream rendering components and in what order the tiles should be processed. The command controller 107 may then provide the tile information to the rendering downstream components, such as a tile controller 120. In an embodiment, a command controller 107 may only identify the tiles that cover a primitive or a background, for example, tiles that are empty may not be sent down the rendering pipeline for efficiency purposes. In an embodiment, a command controller 107 may be configured to determine, for each tile containing at least a portion of a primitive, a tile bounding box that encompasses the at least the portion of the primitive within the tile. The tile bounding box information may then be sent down the rendering pipeline to allow certain operations to focus only on the tile bounding box within a tile rather than the entire tile. In an embodiment, the tile bounding box information may also comprise data indicating which edges of a primitive are contained in the tile bounding box. For example, if a tile contains a top left portion of a trapezoid, the bounding box information may indicate that the tile contains the left and top edges of the trapezoid. In an embodiment, a command controller 107 may be configured to generate a list of primitives that are contained in each of a non-empty tile (a tile that is covering with one or more primitives), and this list may be sent down the rendering pipeline. While memory database 109 is illustrated in FIG. 1B, the memory database 109 may be comprised of multiple memory databases, each memory database being responsible for storing data that is unrelated to data stored in other memory databases. In an embodiment, a command controller 107 may be configured to determine, for each primitive, a primitive bounding box that encompasses the primitive across one or more tiles in a frame (image). The primitive bounding box information may then be sent down the rendering pipeline to allow certain operations to focus on the primitive bounding box rather than the entire frame.

In particular embodiments, once the command controller 107 provides instructions to a tile controller 120 tiles to render, the tile controller 120 may be configured to gather all the primitive, blit, and/or filter information necessary to render the tiles. For every tile to be rendered, a tile controller 120 may begin the rendering process by fetching the tile data from a tile memory database 109, for example, through the input box 106 shown in FIG. 1B. The tile data that is fetched by the tile controller 120 may be passed to downstream components in the rendering pipeline (e.g., shape walker 130). A tile controller 120 may only fetch non-empty tiles from the tile memory database 109. The fetch operation performed by a tile controller 120 may be a single-step process and may involve fetching data associated each primitive within the tiles, including all the vertices of the primitive and a portion of the shader information associated with the primitive. The rest of the shader information may be fetched by a shader 150. A tile controller 120 may also be configured to fetch bilt and filter render instructions from memory that is external to the graphics engine. After parsing through the fetched data, a tile controller 120 may be configured to perform a tile bounding box check. Then, a tile controller 120 may be configured to provide the shader information to a shader 150 and the bilt and filter information to a bilt and filtering unit 180. In an embodiment, a tile controller 120 may be configured to provide tile-done and commands-done indicators to the color buffer 191, 193. This information represents the status with respect to what is processed by a tile controller 120 and what is not.

In particular embodiments, a shape walker 130 may be configured to determine the coverage weight of each pixel within a tile, the coverage weight representing how much of the pixel is covered by a primitive within the tile. In other words, a shape walker 130 may be configured to examine each of the pixels in the tile (or within the tile bounding box) to determine whether the pixels falls inside, outside, or partially intersects with an edge of a primitive (e.g., trapezoid or a quadratic curve). Pixels that are determined to be fully inside a primitive are given a coverage weight of 1, pixels determined to be that are fully outside a primitive is given a coverage weight of 0, and pixels that are intersecting with an edge of a primitive are sent to an integrator 140 for further processing (e.g., an integration step). Partially interacting, or overlapping, pixels require an integration step to precisely determine how much of the pixel overlaps with an edge of a primitive. This information is used for anti-aliasing at a later step in the rendering pipeline. For pixels that are assigned coverage weights of 0 or 1 by a shape walker 130, their respective coverage weights are provided to coverage buffers 151 or 152.

Figure 2:
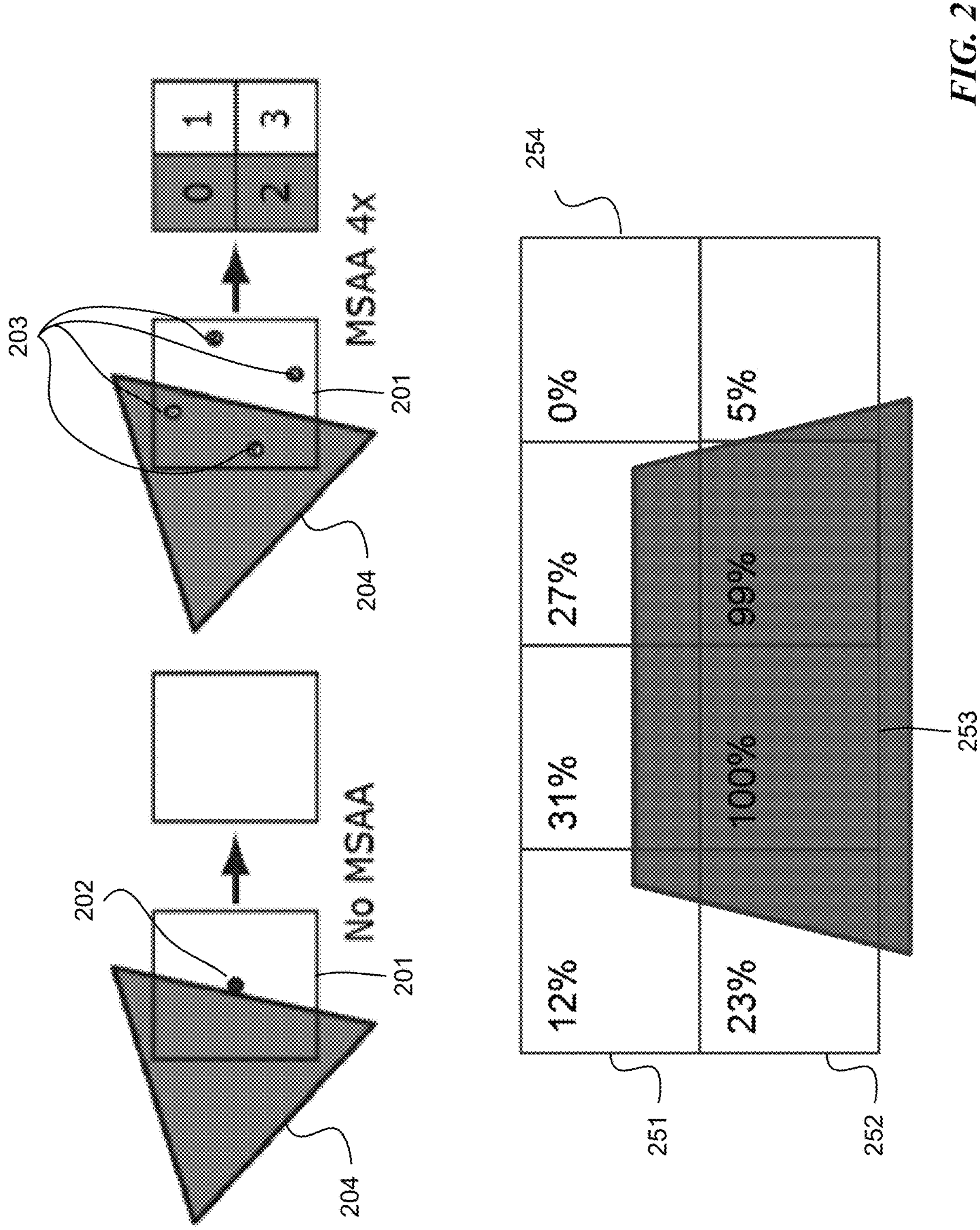
FIG. 2 illustrates an example of sampling and anti-aliasing techniques.

Traditional methods for anti-aliasing typically use sampling or Multi-Sample Anti-Aliasing (MSAA), which involves sampling points within a pixel area to determine the coverage weight for that pixel. For example, as illustrated in FIG. 2, to determine whether a triangle 204 overlaps with the pixel area 201, a graphics system may take a sample at point 202. In this example, the system may determine that the pixel area 201 is not covered by content 204 because, at sample point 202, the triangle 204 does not cover the pixel 201. The system may then assign a coverage weight of 0 to the pixel 201 to indicate that pixel 201 is not covered by any portion of the triangle. Alternatively, instead of taking a single sample from pixel 201, multiple points of samples 203 may be taken. As shown in the top right example in FIG. 2, taking four samples within pixel 201 allows the system to determine a coverage weight of 0.5 or 50%, which is a more accurate coverage weight than 0. As shown by these examples, traditional methods for anti-aliasing can determine coverage weights of higher accuracy as more samples are taken, however, there is a trade-off for taking more samples since each additional sample point requires additional computing power and/or compute time. Moreover, when coverage weights are determined by a way of taking samples, the resulting coverage weights are typically rough estimates and may only provide fixed coverage weights. For example, if one sample is taken, the coverage weight for a pixel can only be either 0 (not covered) or 1 (fully covered). If four samples are taken, the coverage weight for a pixel can only be 0, 0.25, 0.5, 0.75 or 1. In contrast to such traditional methods, embodiments disclosed herein allow the determination of coverage weights in a more granular fashion (e.g., non-fixed coverage weights) and without any sampling. For example, according to an embodiment illustrated in bottom half of FIG. 2, a graphics engine may be able to utilize techniques disclosed herein to determine that 12% of the pixel 251 is covered by a trapezoid 253, 23% of pixel 252 is covered, 100% of pixel 253 is covered, and 0% of pixel 254 is covered.

Figure 3A:
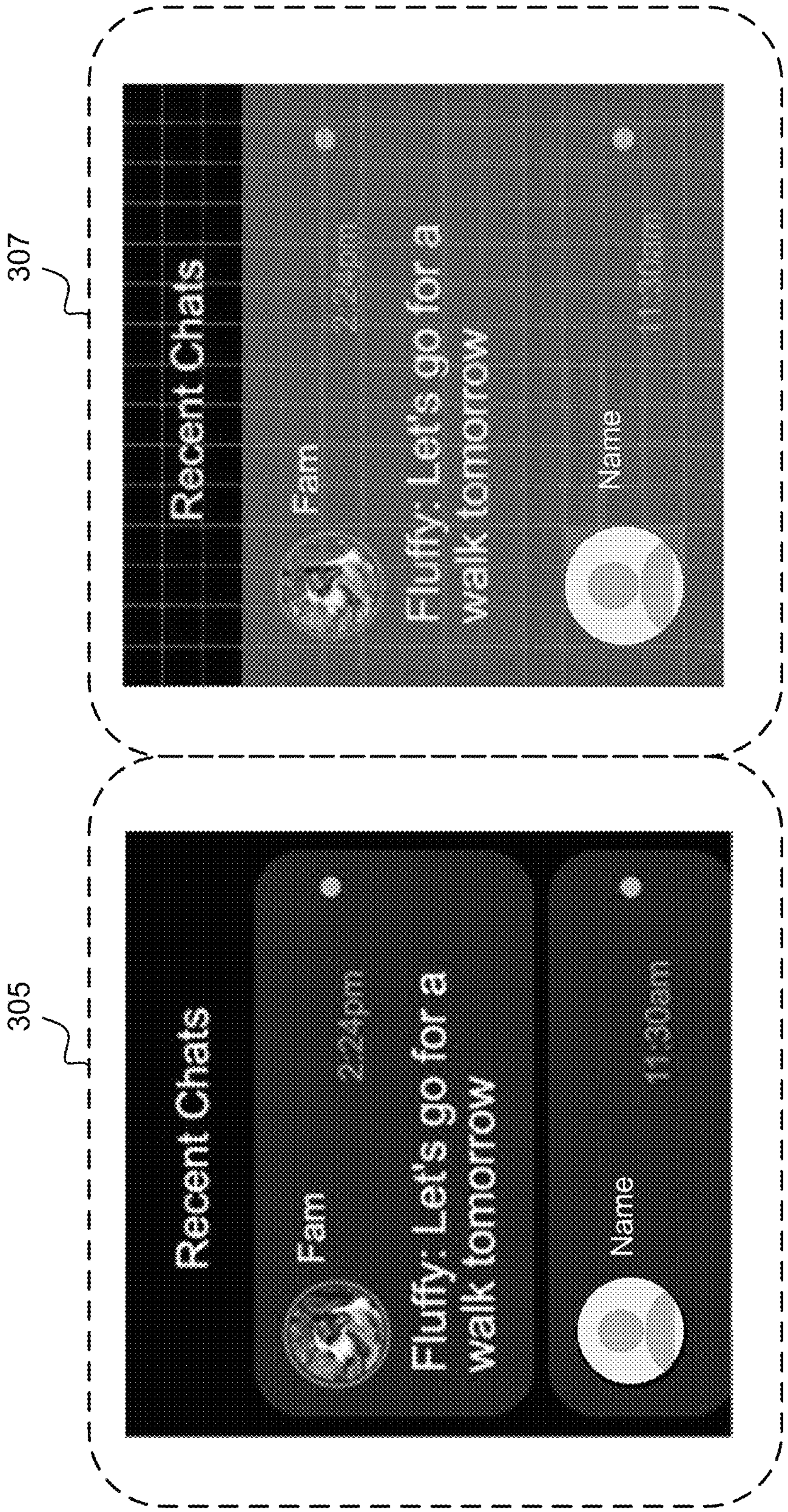
FIG. 3A illustrates an example 2D scene.
Figure 3B:
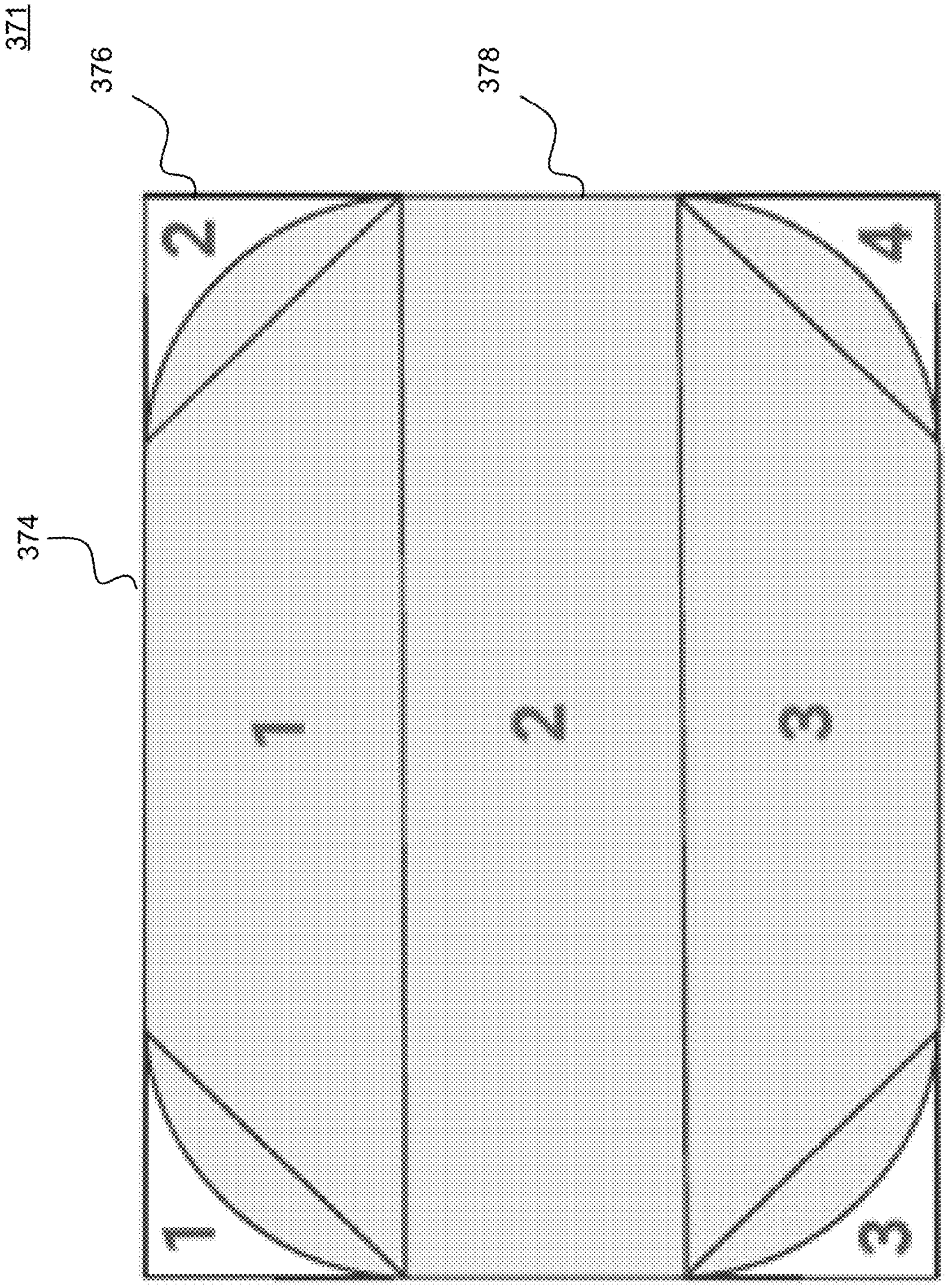
FIG. 3B illustrates an example of 2D content broken down into individual primitives.

In particular embodiments, a scene may be broken down into smaller units of pixels referred to as tiles. For example, FIG. 3A illustrates an example 2D scene 305 and also the same scene 307 that is broken down into individual tiles. Each tile may comprise a fixed number of pixels, such as 16-by-16 pixels or 32-by-32 pixels. In particular embodiments, content within a scene may be broken down into smaller units referred herein as primitive (e.g., a quadratic curve, trapezoid). FIG. 3B illustrates an example of 2D content 371 that may be shown in a scene and broken down into individual primitives. Specifically, FIG. 3B illustrates content 371 that is broken down into four quadratic curves 376 representing the corners of content 371, two trapezoids 374 representing top and bottom portions of the content 371, and one "trapezoid" 378 in the center portion of the content 371. While trapezoid 378 may appear to be a rectangle rather than a trapezoid in the literal sense, embodiments may be configured to consider trapezoid 378 as a trapezoid with side edges that are vertically oriented (e.g., perpendicular from the top and bottom edges). In particular embodiments, referring to FIG. 1A, an application 101 may be configured to break down content into primitives and may provide the primitives and information about the primitives to a driver 102.

In an embodiment, a shape walker 130 may be configured to utilize an algorithm known as DDA (digital differential analyzer) line generating algorithm to determine whether a pixel intersects with an edge of a primitive. The technique of identifying intersecting pixels may involve first determining a function equation that represents an edge of a primitive (or otherwise referred as an "edge definition"), then utilizing an algorithm to determine whether a pixel overlaps/intersects with the edge represented by the function equation. For example, if a primitive is a trapezoid, a shape walker 130 may first determine the maximum and minimum Y values of the trapezoid (e.g., top and bottom edge of the trapezoid) and y-intercepts and slope of an edge (or both edges if two side edges of the trapezoid fits into one tile). The y-intercepts and slope may be used to determine a function equation (e.g., linear equation) that represents a corresponding edge. Then, the technique may continue by traversing row-by-row of the tile to identify, based on the function equation identified in the previous step, pixels that are intersecting with the edge of the trapezoid (e.g., the function equation). The intersecting pixels are sent to the integrator to determine the pixel coverage weight, and pixels that fall completely outside of the trapezoid are assigned coverage weight of 0 and pixels that fall completely inside the trapezoid are assigned coverage weight of 1. On the other hand, if the primitive is a quadratic curve, the same high-level technique of identifying the overlapping pixels and applying weights to non-overlapping pixels are used, but in contrast to if the primitive is a trapezoid, a quadratic formula is used to represent the curve rather than a linear equation.

Figure 4A:
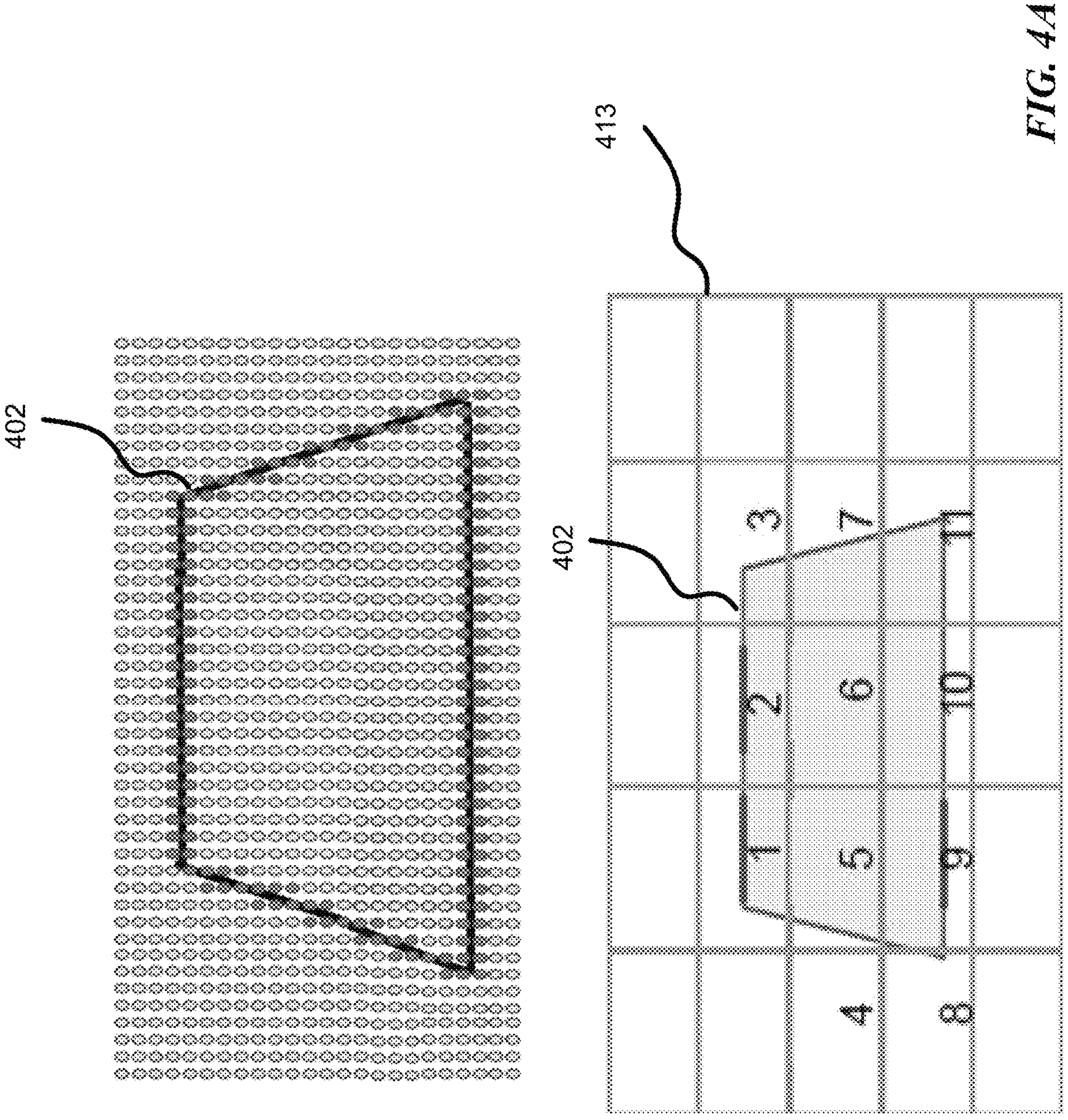
FIGS. 4A-4B illustrate an example technique of determining whether a pixel intersects with an edge of a trapezoid.
Figure 4B:
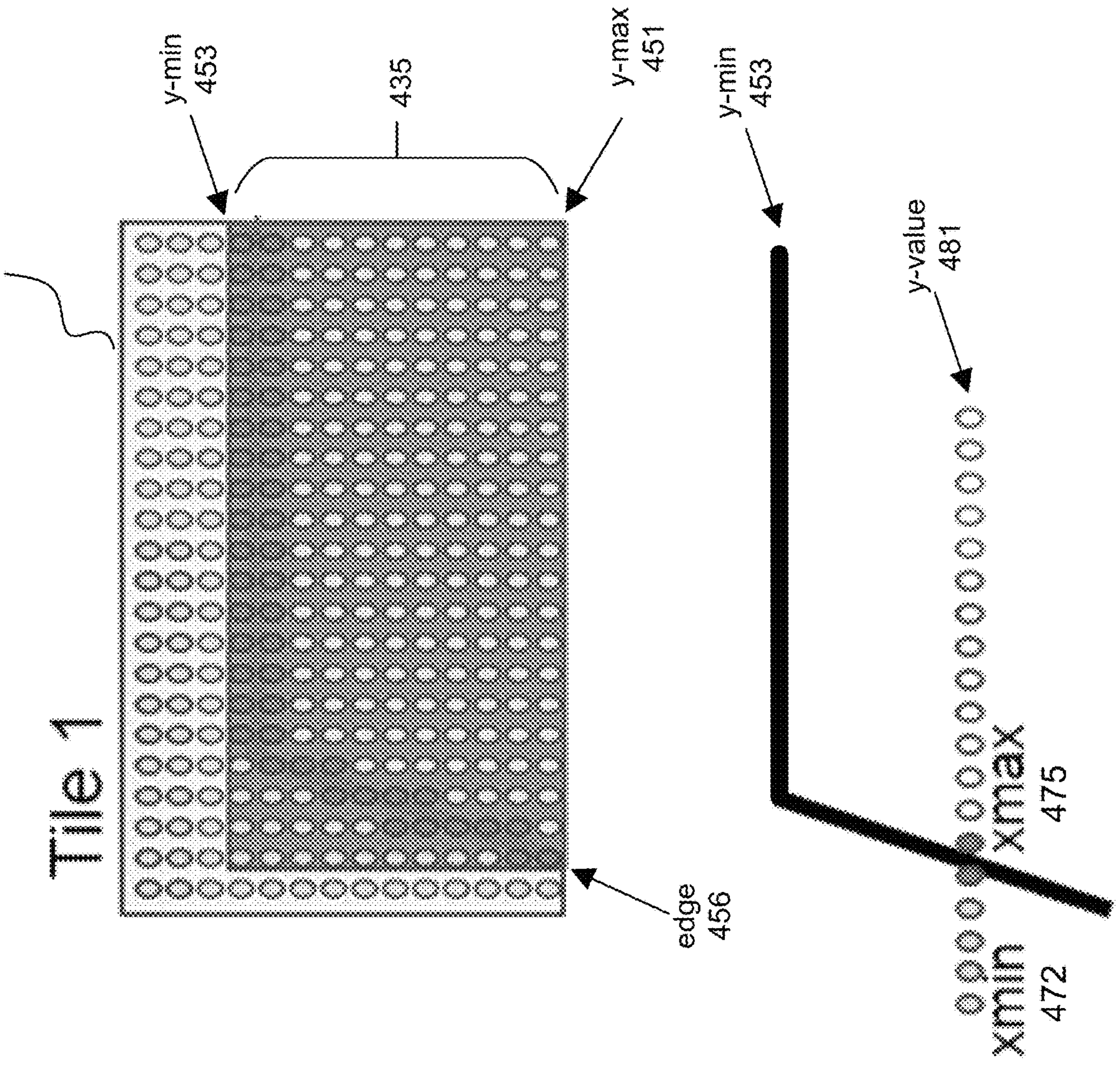

FIGS. 4A-4B illustrate an example technique of determining whether a pixel intersects with an edge of a trapezoid. Specifically, FIG. 4A illustrates a trapezoid 402 that is covering pixels of several tiles. In particular embodiments, a shape walker 130 processes a particular primitive tile by tile. For example, a shape walker 130 may be configured to process each of the numbered tiles in box 413 in the sequence of the illustrated numbers (e.g., tile 1, tile 2, . . . tile 11). Such a sequence of the tiles may be determined by a command controller 107 and provided to downstream components in the rendering pipeline such as a shape walker 130. FIG. 4B illustrates the first tile 423 shown in FIG. 4A and further illustrates the step of determining whether pixels within the tile 423 intersects with an edge of the trapezoid 402. In particular embodiments, a shape walker 130 may receive the tile bounding box information that outlines a box 435 that encompasses a primitive or a portion of thereof. A shape walker 130 may be configured to process the pixels only within the bounding box, rather than the entire tile. The tile bounding box information that a shape walker 130 receives may also indicate which edges of primitives are contained within a tile. For example, in the example shown in FIG. 4B, the tile bounding box information may indicate that only the left and top edges of a trapezoid 402 are contained in tile 423. The tile bounding box information may further indicate whether, for an edge within the tile, whether the entirety of the edge is in the tile or only a portion of the edge is within the tile. For example, in the example shown in FIG. 4B, the tile bounding information may indicate that only a portion of the top edge and only a portion the left edge of a trapezoid 402 are contained in tile 412.

In particular embodiments, a shape walker 130 may be configured to analyze each pixel position within a tile to determine whether the corresponding pixel overlaps/intersects with an edge of a primitive (e.g., trapezoid or curve). A shape walker 130 may be configured to process, for each primitive within a tile, a single edge at a time. For example, in the example shown in FIG. 4B, a shape walker 130 may be configured to process the left edge 456 separately from the top edge. In particular embodiments, when a shape walker 130 is processing one of the side edges of a trapezoid, the shape walker 130 may be configured to determine y-min and y-max values of the primitive. For example, as shown in FIG. 4B, the portion of a trapezoid shown within tile 423 comprises a y-min 453 representing the top edge of the portion of the trapezoid and a y-min 451 representing the bottom portion of the primitive that is within tile 423. Such y-min and y-max values may be determined by a shape walker 130, for example, based on the bounding box information. A shape walker may then determine y-intercepts and a slope of a side edge. For example, as shown in FIG. 4B, a shape walker 130 may be configured to determine the y-intercepts and a slope of the edge 456 of the trapezoid. Using this information, a shape walker 130 may be configured to determine a function equation based on a linear equation (e.g., ax+b) that defines a side edge of a trapezoid. In a different circumstance where a tile includes only a right side edge of a trapezoid, a function equation for the right edge may similarly be determined based on the y-intercepts and a slope of the right edge. In yet another circumstance where a tile includes both a left side edge and a right side edge, a shape walker 130 may also similarly determine the function equation for both of the edges, but in separate operations.

Once the y-min, y-max, and function equation is determined for a particular edge contained in a tile, a shape walker 130 may be configured to traverse the tile row-by-row (e.g., from y-min to y-max) and determine, for each row, pixels that intersect with an edge of a trapezoid based on the function equation. For example, referring to FIG. 4B, a shape walker 130 may be configured to traverse the tile 423 row by row, starting at y-min 453 and ending with y-max 451. A shape walker 130 may then determine, for each row, and based on the function equation, the x-min and x-max values for that row (the x-min value representing the leftmost position at which a pixel intersects with a side edge of a trapezoid and the x-max value representing the rightmost position at which a pixel intersects with the left edge of the trapezoid). For example, as shown in FIG. 4B, a shape walker may determine, at the row corresponding to y-value 481, x-min value 472 and x-max value 475 for a left-side edge of a trapezoid. In a different circumstance where a tile includes a right side edge of a trapezoid, the x-min and x-max values may similarly be determined based on a corresponding function equation. In yet another circumstance where a tile includes both a left side edge and a right side edge, a shape walker 130 may also similarly determine the function equation for both of the edges, but in separate operations. In particular embodiments, a shape walker 130 may be configured to determine the x-min and x-max values for a top or bottom edge based on the function equation of the side edges and/or the bounding box information. For example, referring to FIG. 4A, a shape walker 130 may determine, based on the bounding box information, that tile 2 contains only a top edge of a trapezoid and that none of the side edges are contained in tile 2. Based on this determination, a shape walker 130 may determine that the top edge spans across the entirety of the length of the bounding box, and thereby determine the x-min values and x-max values based on the position of the bounding box. A shape walker 130 may similarly determine the x-min and x-max values of the bottom edge of a trapezoid contained in tile 10. If a bounding box for a particular tile contains either a top or bottom edge in addition to one of the side edges, such as tile 1 shown in FIG. 4B, a shape walker 130 may be configured to plug in the y-value of the top/bottom edge into the function equation of the side edges to determine the x-min and x-max values of the top/bottom edge. For example, referring to FIG. 4B, a shape walker 130 may determine the x-min value of the top edge by plugging in y-min value 453 into the function equation of edge 456. As for the x-max value, a shape walker 130 may determine that, since the right side edge is not contained in tile 423, the x-max value equals the rightmost x value of the bounding box 435. The techniques discussed above may be used to determine the x-min and x-max values of any of the top or bottom edges of a trapezoid. In an embodiment, for each row in a tile, a shape walker 130 may be configured to determine the individual pixels that are intersecting with an edge of a trapezoid based on the x-min and x-max values determined using the techniques discussed above. For pixels that are intersecting with an edge of a trapezoid, a shape walker 130 may identify those pixels to an integrator 140, as explained further below.

Figure 5A:
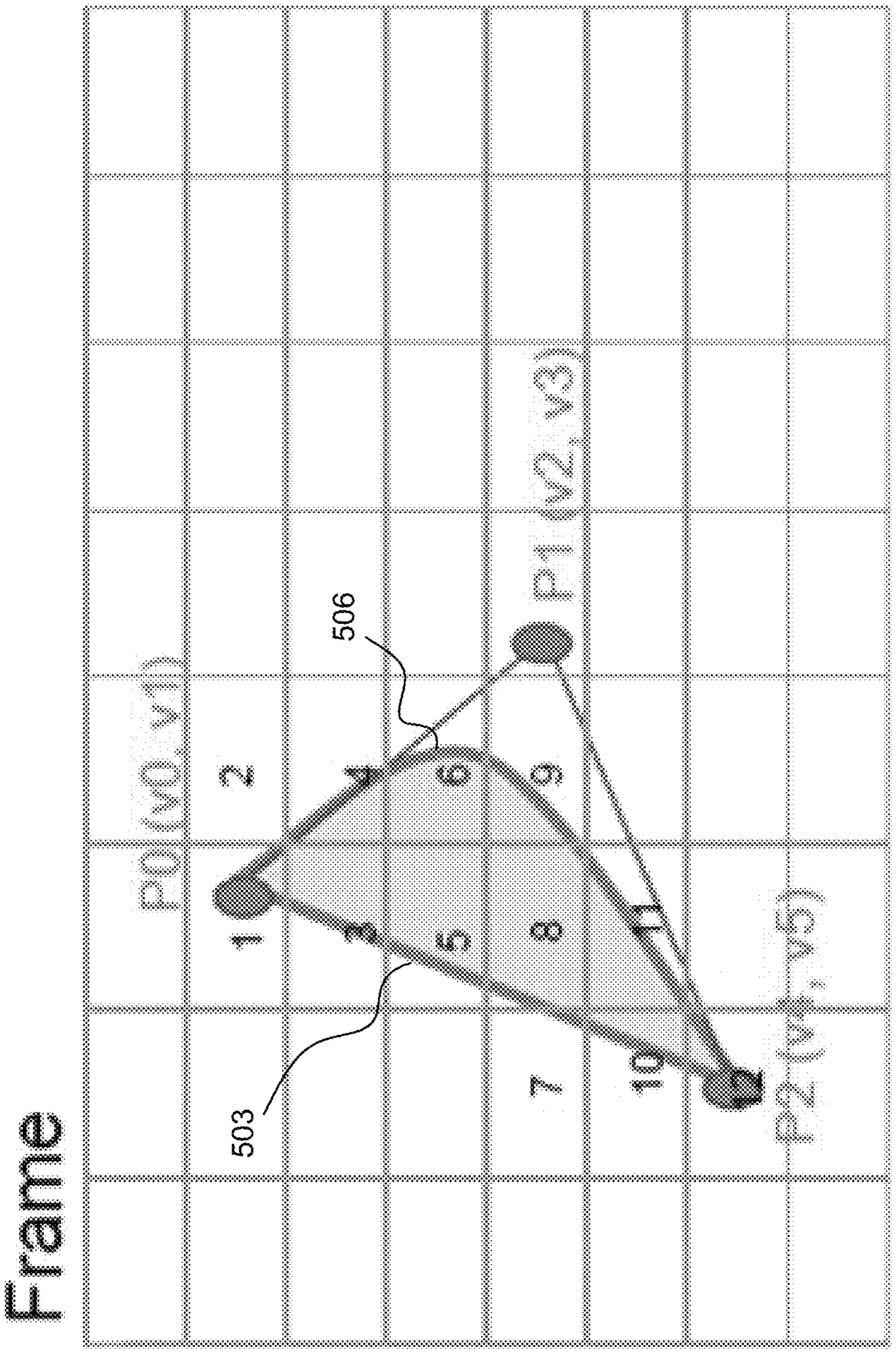
FIG. 5A illustrates an example quadratic curve primitive.

If the primitive is a quadratic curve, rather than a trapezoid, in accordance to particular embodiments, a shape walker 130 may be configured to analyze each pixel position within a tile to determine whether the corresponding pixel overlaps/intersects with an edge of a quadratic curve. As shown in FIG. 5A, a quadratic curve primitive may be comprised of two edges, one flat edge 503 and one curved edge 506. A shape walker 130 may be configured to process, for each quadratic curve within a tile, a single edge at a time. The technique of determining whether a pixel overlaps/intersects with a flat edge of a quadratic curve is substantially similar to the technique described above with reference to a trapezoid, for example, by representing the flat edge with a linear equation. The technique of determining whether a pixel overlaps/intersects with a curved edge of a quadratic curve is also substantially similar to the technique described above with reference to a trapezoid, but in contrast, a quadratic formula is used to represent the curved edge rather than a linear equation. For example, referring to FIG. 5A, a quadratic equation (ax2+bx+c) may be used to represent the function equation for the curved edge 506. Such quadratic equations may be determined based on the three vertices (P0, P1, P2) of the quadratic curve shown in FIG. 5A. The location of such vertices may be determined by a driver 102 or an application 101 and provided to a graphics engine 103 (e.g., shape walker 130).

Figure 5B:
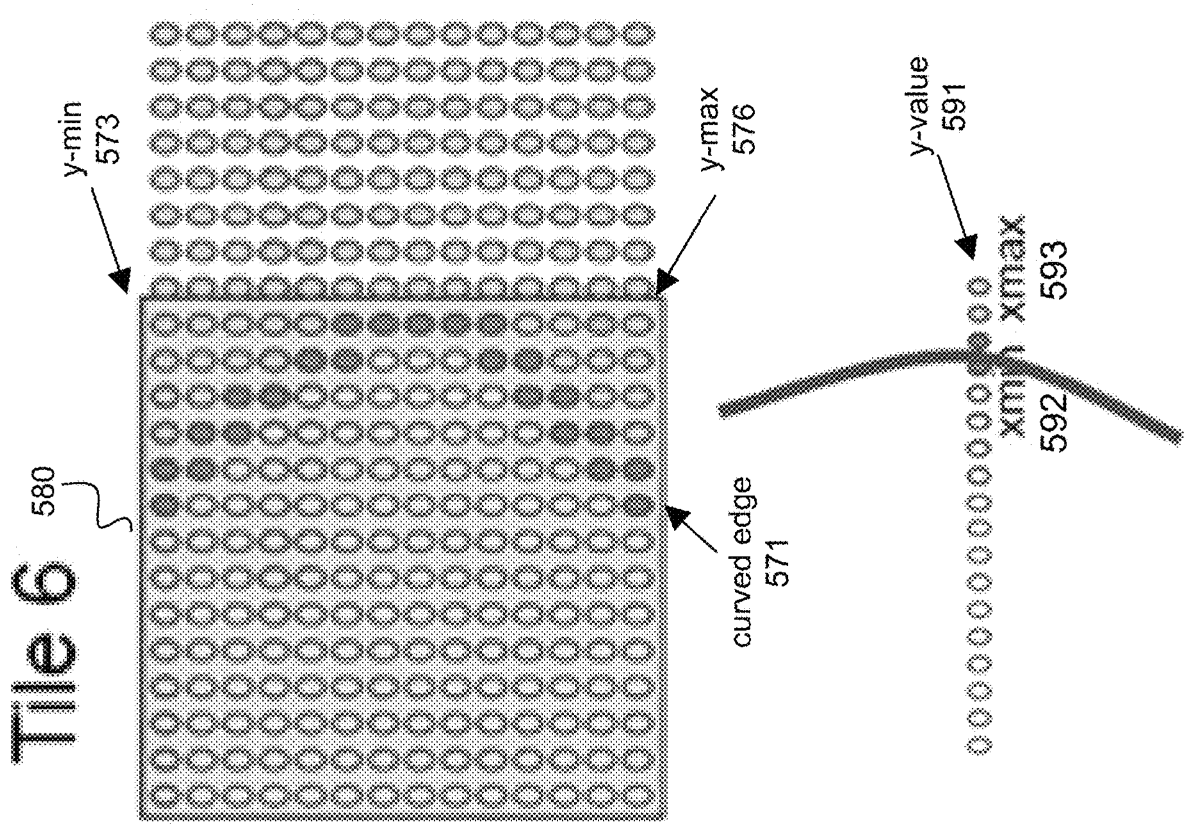
FIG. 5B illustrates an example tile comprising a curved edge of a quadratic curve.

In particular embodiments, to determine the function equation for a curved edge of a quadratic curve, a shape walker 130 may be configured to determine the y-min and y-max values and y-intercepts of the curved edge. A shape walker 130 may then use this information and the three vertices of a quadratic curve (e.g., such as those shown in FIG. 5A) to determine a quadratic equation that represents the curved edge of the quadratic curve. FIG. 5B illustrates an example tile comprising a curved edge 571 of a quadratic curve. Once the y-min, y-max, and function equation is determined for a curved edge of a quadratic curve, a shape walker 130 may be configured to traverse the tile row-by-row (e.g., from y-min to y-max) and determine, for each row, pixels that intersect with the curved edge based on, for example, the quadratic equation and the DDA line generating algorithm. For example, a shape walker 130 may be configured to traverse the tile 580 row by row, starting at y-min 573 and ending with y-max 576. For each row, a shape walker 130 may be configured to determine the x-min and x-max values for that row based on the corresponding quadratic equation. Referring to the bottom half of FIG. 5B, a shape walker 130 may determine, for the row corresponding to y-value 591, that x-min 592 is the leftmost position at which a pixel intersects with a curved edge of a quadratic curve and that x-max 593 is the rightmost position at which a pixel intersects with the curved edge of the trapezoid. In an embodiment, for each row in a tile, a shape walker 130 may be configured to determine the individual pixels that are intersecting with an edge of a quadratic curve based on the x-min and x-max values determined using the techniques discussed above. For pixels that are intersecting with an edge of a quadratic curve, a shape walker 130 may identify those pixels to an integrator 140, as explained further below.

In particular embodiments, once the x-min and x-max values that are defining the pixels intersecting with an edge of a primitive have been determined for each row within a tile, a shape walker 130 may be configured to assign each pixel within the tile a coverage weight or flagged for the integrator 140. Pixels that are overlapping with an edge of a primitive are flagged and provided to an integrator 140. Pixels that are fully outside a primitive are assigned a coverage weight of 0. Pixels that are fully inside a primitive are assigned a coverage weight of 0. A shape walker 130 may be configured to assign every pixel outside the bounding box a coverage weight of 0. To evaluate pixels that are inside the bounding box, a shape walker 130 may walk through each pixel row-by-row. For example, referring to FIG. 4B, a shape walker 130 may start from y-min 453 and determine that y-min 453 corresponds to a top edge of a trapezoid. A shape walker 130 may then assign a coverage weight of 0 to pixels that are located to the left of the previously determined x-min value for this row. A shape walker 130 may also determine that pixels that are located to right of the of the x-min value for that row intersect with the top edge of the trapezoid and flag those pixels to the integrator 140. For the row corresponding to y-min 453+1, a shape walker may similarly determine that the row also corresponds to the top edge and assign a coverage weight of 0 to pixels that are located to the left of the x-min value previously determined for that row and flag pixels that are located to right of the x-min value for the integrator 140. For the row corresponding to y-min 453+2, a shape walker may determine that that this row corresponds to a left-side edge of a trapezoid. A shape walker may then assign a coverage weight of 0 to pixels that are located to the left of the corresponding x-min value, flag pixels that are between x-min and x-max (including pixels having x-min and x-max values), and assign a coverage weight of 1 to pixels that are located to right of the corresponding x-max value. A shape walker may repeat these steps for each row within the bounding box until all pixels within the bounding box are either assigned a coverage weight or flagged for the integrator 140. This example technique may similarly be applied to tiles containing other edges of a trapezoid. For example, if the tile 423 shown in FIG. 4B included the right side edge of a trapezoid rather than a left side edge, pixels to the left of the edge would be assigned a coverage weight of 1, while pixels to the right of the edge would be assigned a coverage weight of 0. In particular embodiments, pixels that are intersecting with a top edge or a bottom edge of a trapezoid may be flagged for an integrator 140. The above example technique may similarly be applied to tiles containing an edge of a curve based on the x-min and x-max values determined based on a linear equation (for the flat line) or a quadratic equation (for the curved line).

In particular embodiments, a shape walker 130 may be configured to examine, prior to determining coverage weights of pixels that are fully outside or inside a primitive and prior to flagging pixels that are intersecting with an edge of a primitive, whether the tile bounding box is bigger than a minimal threshold size. If the bounding box is smaller than a minimal threshold size (such as 1×1 pixel or 2×2 pixels), a shape walker 130 may be configured to send all of the pixels within the bounding box to an integrator 140 to determine their respective coverage weight, rather than going through the steps described in the preceding paragraphs. In an embodiment, determining whether the bounding box is bigger than a threshold size may be implemented for a trapezoid but not for a quadratic curve.

An integrator 140 may be configured to determine anti-alias pixel coverage weights for each pixel flagged by a shape walker 130. Pixels that are assigned a coverage weight by an integrator 140 are forwarded to a coverage buffer 151 or 152. An integrator 140 may only be responsible for determining coverage weights for pixels that are flagged by a shape walker 130, for example, pixels that intersect an edge of a primitive. As discussed above, coverage weights for pixels that are fully outside or fully inside a primitive are assigned by a shape walker 130. The technique of determining the anti-alias pixel coverage weights for each pixel flagged by a shape walker 130 (e.g., partially covered by a primitive) involves utilizing the well-understood property of a trapezoid or a quadratic curve function. An example of such a technique is disclosed in the following paper, which is incorporated herein: A. Ellis, W. Hunt, J. Hart, Nerf: *Real-Time Analytic Antialiased Text for* 3-*D*) *Environments*, Computer Graphics forum, vol. 38, issue Nov. 8, 2019, pp. 23-32.

In particular embodiments, coverage buffers 151 and 153 may be configured to store and maintain coverage weights for pixels, as determined by either a shape walker 130 or an integrator 140. In particular embodiments, two coverage buffers may be configured in a double buffer configuration such that one coverage buffer is assigned to the rasterization process while the other is assigned to the shading process, then alternating the roles as necessary. For example, referring to FIG. 1A, the double buffer configuration allows a first coverage buffer (e.g., 151) to be updated by a shape walker 130 and integrator 140, while a second coverage buffer (e.g., 153) can be accessed by other components of the system, for example, a shader 150.

In particular embodiments, each coverage buffer may be configured to store a coverage weight for each pixel within a tile. A coverage weight of zero represents full transparency, and a value of 1 (or in some embodiments 2^10-1 (i.e., 1023)) represents a fully opaque. Intermediate values between full transparency and fully opaque represent partially transparent pixels that can be combined with a background image to yield a composite image. As discussed previously, in accordance to embodiments, instructions to update the coverage buffer for pixels that are fully transparent or fully opaque are received from a shape walker 130 and instructions to update the coverage buffer for pixels that are partially transparent are received from an integrator 140.

In particular embodiments, a shader 150 may be configured to perform fixed function shading of the pixels of a primitive. In particular embodiments, a shader 150 may be configured to perform any of the following types of shading operations: solid fill, gradient fill, and texturing. Texturing involves invoking a texture unit 170. In particular embodiments, a shader 150 performs shading operations tile by tile, and for each tile, pixel by pixel based on the coverage weight associated with each pixel. A shader 150 may be configured to determine the source color information and the determined information may be passed on to a color buffer 191 or 193 for blending operations. In an embodiment, a shader 150 generates the texture space coordinates by transforming the conversion matrix from the shader information into texel space coordinates. A shader 150 may then be configured to adjust for the shear and then clamps the output to send it to the texture block.

In particular embodiments, color buffers 191 and 193 may be configured to perform blending operations. In particular embodiments, two color buffers may be configured in a double buffer configuration to allow one color buffer to be updated while the other is being accessed. Color buffers 191 and 193 may receive the source color information and pixel coverage weights from a shader 150 or a blit and filtering unit 180. Based on a gamma correction mode, color buffers 191 and 193 may be configured to convert the input source color into gamma space before performing a blending operation. Once converted, the output may be converted back to linear space using the degamma unit. Such gamma conversion steps are optional. After color buffers 191 or 193 finishes the blending operations, the blended color data may be streamed out to the tile compress and store 195. The blended color data may be streamed out in a block by block fashion (e.g., 4×4 pixel arrays).

As discussed above, in an embodiment, a command controller 107 may determine, for each tile containing at least a portion of a primitive, a tile bounding box that encompasses the at least the portion of the primitive. This technique may be referred as a "culling" technique where tiles of a frame (e.g., 16×16 pixels) are culled using a smallest bounding box that encompasses a primitive being processed by the graphics processing unit (GPU), or a graphics system. Only the tiles covered by the primitive bounding box may be identified to the downstream GPU components in the rendering pipeline to allow the downstream GPU components to effectively ignore the empty tiles (i.e., tiles that are completely outside any primitive bounding box). This reduces the overall computing required and makes the system more efficient. Incorporating this culling technique, however, presents a challenge because the technique conflicts with some of the blending modes that are used to blend overlapping primitives. Examples of such blending modes may include blending modes that are referred to as src, sreln, srcOut, dstAtop, and dstln (hereinafter referred to as "special blending modes"). These special blending modes require access to both the tiles covering the destination primitive (tiles already in the color buffer) and the tiles covering the source primitive (tiles that are to be written into the color buffer). For example, the special blending modes may require access to the tiles covering the source primitive to update the color information of the pixels in those tiles while also requiring access to the tiles covering the destination primitive to clear/update/remove the color information of the pixels in the tiles covering the destination primitive. However, due to the culling technique, when a graphics system is processing a source primitive, the graphics system only has access to tiles covering the source primitive and do not have access to the tiles of the destination primitive. Embodiments disclosed herein provide a technique for addressing this challenge. Blending modes that do not require updating the pixels in the tiles covering the destination primitive are referred herein as "normal blending modes." Operations that involve special blending modes may herein be referred to as "special blending operations." Operations that involve normal blending modes may herein be referred to as "normal blending operations."

References to a destination primitive herein may refer to a "shape" that is stored in a color buffer, which may be a primitive or a blend of multiple primitives that have been blended into the color buffer. References to a source primitive herein may similarly refer to a "shape" that is to be stored/blended into a color buffer, which may be a primitive.

Figure 6:
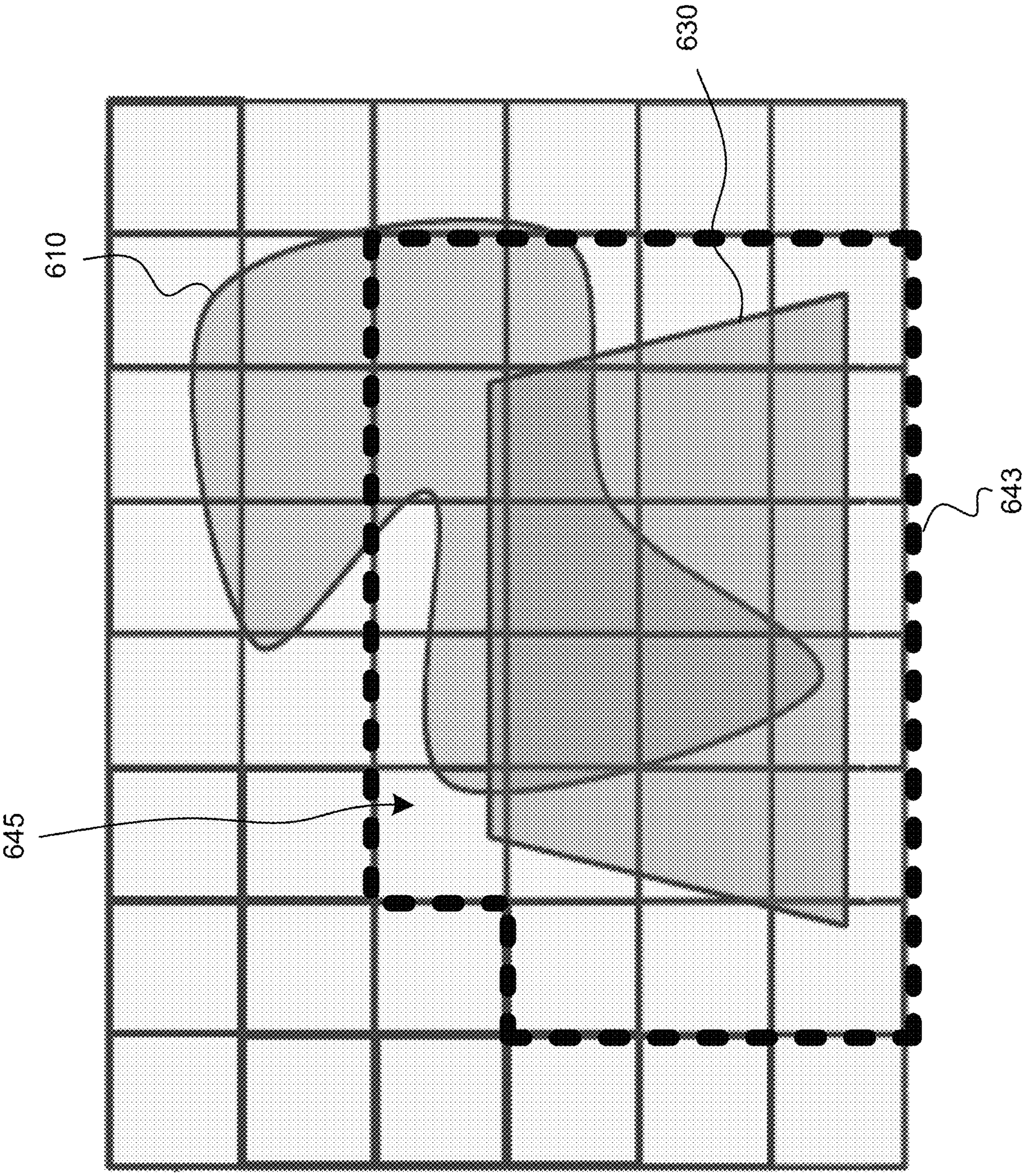
FIG. 6 illustrates an example frame with two primitives, a destination primitive and a source primitive.

In particular embodiment, a graphic system may be configured to implement the blending operations sequentially, primitive by primitive. This means that, when the system is processing a particular primitive, only the tiles covered by the primitive are processed by the system while other tiles are ignored. If, for example, a particular frame comprises multiple primitives, each of the primitive may be processed one at a time, in a sequence, which may require processing the same tiles multiple times if multiple primitives are covered by the tiles. FIG. 6 illustrates an example frame with two primitives, a destination primitive 610 and a source primitive 630. The destination primitive 610 represents a primitive that is already stored in a color buffer, while the source primitive 630 represents a primitive that is to be written into the color buffer. Tiles that are covering the destination primitive 610 may be referred herein as destination tiles and tiles that are covering the source primitive 630 may be referred herein as source tiles. When blending two overlapping primitives, such as those illustrated in FIG. 6, special blending modes require an operation where the primitive in the destination tiles are cleared of the pixel values, but as discussed above, a graphics system may not have access to the destination tiles.

In particular embodiments, the task of clearing a destination primitive may first involve categorizing the tiles in a frame as "non-empty tiles" when the tiles cover a source primitive and as "empty tiles" when the tiles do not cover the source primitive. For example, in FIG. 6, the tiles within the dotted outline 643 may be categorized as non-empty tiles since a source primitive 630 touches each of those tiles. Tiles that are outside the dotted outline 643 may be categorized as empty tils since none of them touch the source primitive 630.

In particular embodiments, when executing a special blending mode, a graphics system may clear a destination primitive from empty tiles by instructing the color buffer to bypass the primitive cull associated with a source primitive (e.g., bounding box of the source primitive) to allow the color buffer to gain access to previously inaccessible tiles (e.g., tiles that are beyond the source primitive's bounding box). The color buffer may then be configured to clear the empty tiles by updating the pixel values associated each pixel within the empty tiles (e.g., tiles that are beyond the source primitive's bounding box and associated with a destination primitive/shape). Alternatively, a graphics system may be configured to instruct the color buffer to process a dummy primitive (e.g., a primitive associated with clear color values) that overlaps the destination primitive, effectively "clearing" the color information of the destination primitive by replacing it with clear color information.

For non-empty tiles, the clearing task is a bit more complicated since only the destination primitive must be cleared from the non-empty tiles are covering both the destination primitive and the source primitive. For example, in FIG. 6, the clearing task would require clearing only a portion of tile 645 covering a destination primitive 610 without also clearing the portion of the tile 645 covering a source primitive 630. The techniques disclosed above with reference to clearing the empty tiles-as opposed to non-empty tiles here-will not be appropriate for tile 645 since, for example, implementing the above techniques may also clear the source primitive within tile 645. Embodiments disclosed herein, therefore provide a solution to this problem by utilizing a pixel-by-pixel analysis to identify particular pixels within a tile that is only associated with a destination primitive then selectively clearing the pixel values associated with the identified pixels.

For clearing a destination primitive from non-empty tiles, in accordance to particular embodiments, a graphics system may maintain status bits for each of the pixels in the non-empty tiles that track the recent blending mode(s) that has been used for that pixel or whether the most recent blending mode used for that pixel is a normal blending mode or a special blending mode. The graphics system may use the status bits to identify pixels that have been touched by the most recent normal blending operation, i.e., pixels covering a destination primitive. In particular embodiments, a graphics system assigns a primitive a blending mode (normal blending mode or special blending mode) before the primitive is blended into a color buffer. For example, referring to FIG. 6, a graphics system may have assigned the destination primitive 610 a normal blending mode before it was blended into the color buffer and the source primitive 630 with a special blending mode before it is blended into the color buffer. Pixel values associated with a primitive are similarly associated with data indicating whether it is associated with a normal blending mode or a special blending mode.

In particular embodiments, a graphics system may be configured to utilize status bit W0 to indicate whether a pixel has been touched by a normal blending mode and status bit W1 to indicate whether a pixel has been touched by a special blending mode. For example, status bits "00" (equivalent to side-by-side status bits W1 and W0) is used to indicate that a pixel has not been touched by any blending operations, and thus pixel values associated with the pixel should correspond to the background color of a frame. Status bits "01" is used to indicate that a pixel has been touched by a normal blending mode. Status bits "10" is used to indicate that a pixel has been touched by a special blending mode. Status bits "11" is used to indicate that a pixel has been touched by both normal and special blending modes. For example, in FIG. 6, when the source primitive 630 is blended into the color buffer, pixels that are covering only the destination primitive 610 may be associated with status bits 01, pixels that are covering only the source primitive 630 may be associated with status bits 10, pixels that are covering both the destination primitive 610 and the source primitive 630 (the overlapping region) may be associated with status bits 11, and pixels that are not associated either primitives may be associated with status bits 00. In an embodiment, when overlapping pixels for which status bits will be 10, appropriate blending operation may be performed by using background color information as destination color. Whereas when status bit 11 is encountered, appropriate blending operation is performed by reading the color from color memory as destination color In particular embodiments, at the end of each special blending operation, a graphics system may be configured to implement a "flag treatment step" by which status bits are reset such that status bits 00 remains as 00, status bits 01 are changed to 00, and status bits 10 and 11 are changed to 01. When the graphics system finishes blending a frame, the graphics system may be configured to export the color information of the pixels based on the current status bits: for pixels with status bits 00, the graphics system may export the background color information rather than retrieving the color information from the color memory; for pixels with status bits 01, the graphics system may export the color information from the color memory. Once the flag treatment step is executed at the end of a special blending operation, the graphics system may be able to identify pixels that have been touched by that special blending operations by searching for pixels that are associated with status bits 01. Other pixels in the frame should be associated with status bits 00 due to the resetting process discussed above with reference to the flag treatment step. And, as discussed above, when exporting the color information for pixels associated with status bits 00, the graphics system may not retrieve the color information from the color buffer, rather the system may simply retrieve/use the background color information. The use of the background color information when exporting the pixel color information is effectively equivalent to clearing the pixel values associated the pixels with status bits 00 since pixels without any value correspond to the background color. In other words, the flag treatment step effectively clears out the destination primitive since the pixels that has been touched only by a normal blending mode (status bits 00 and 01 before the flag treatment step) are changed to 00 and background color information is exported for those pixels. In some embodiments, the flag treatment step is executed not at the end of special blending operation but prior to the beginning of a subsequent blending mode that follows a special blending operation. In an embodiment, a graphics system also maintains additional status data indicating the previous blending mode that has touched a pixel, if any, to determine the transition between the blending operations.

References to pixel values or pixel color information as used herein may refer to any of the red, green, or blue color channels, and/or opaqueness channel.

In particular embodiments, a texture unit 170 may be configured to provide texture information for pixel covered by a primitive and shades the color of the pixel. If the covered pixel has texture fill, then corresponding texture image may be fetched and filtered to obtain the color information for the covered pixel. The covered pixel may then be shaded with the derived color.

In particular embodiments, a tile compress store 195 may be configured to receive the rendered tile data from color buffers 191 and 193. A tile compress store 195 may comprise a block encoder (e.g., hardware encoder) that is configured to encode the rendered tile data before being transmitted to a display driver 198. In particular embodiments, a tile compress store 195 may be responsible for encoding static assets (e.g., a blit such as an emoji, a company logo, or a watch face for a smart watch), which may be stored a memory external to the graphic engine 103 to be accessed at a later time point. Static images need to be encoded at low power but with high throughput. To achieve such a feat, when encoding an image (asset), a tile compress store 195 may use a "spatial prediction" technique that leverages the fact that some groups of pixels in an image comprises the same pixel values as other groups. Additional details for this technique are described below.

Figure 7:
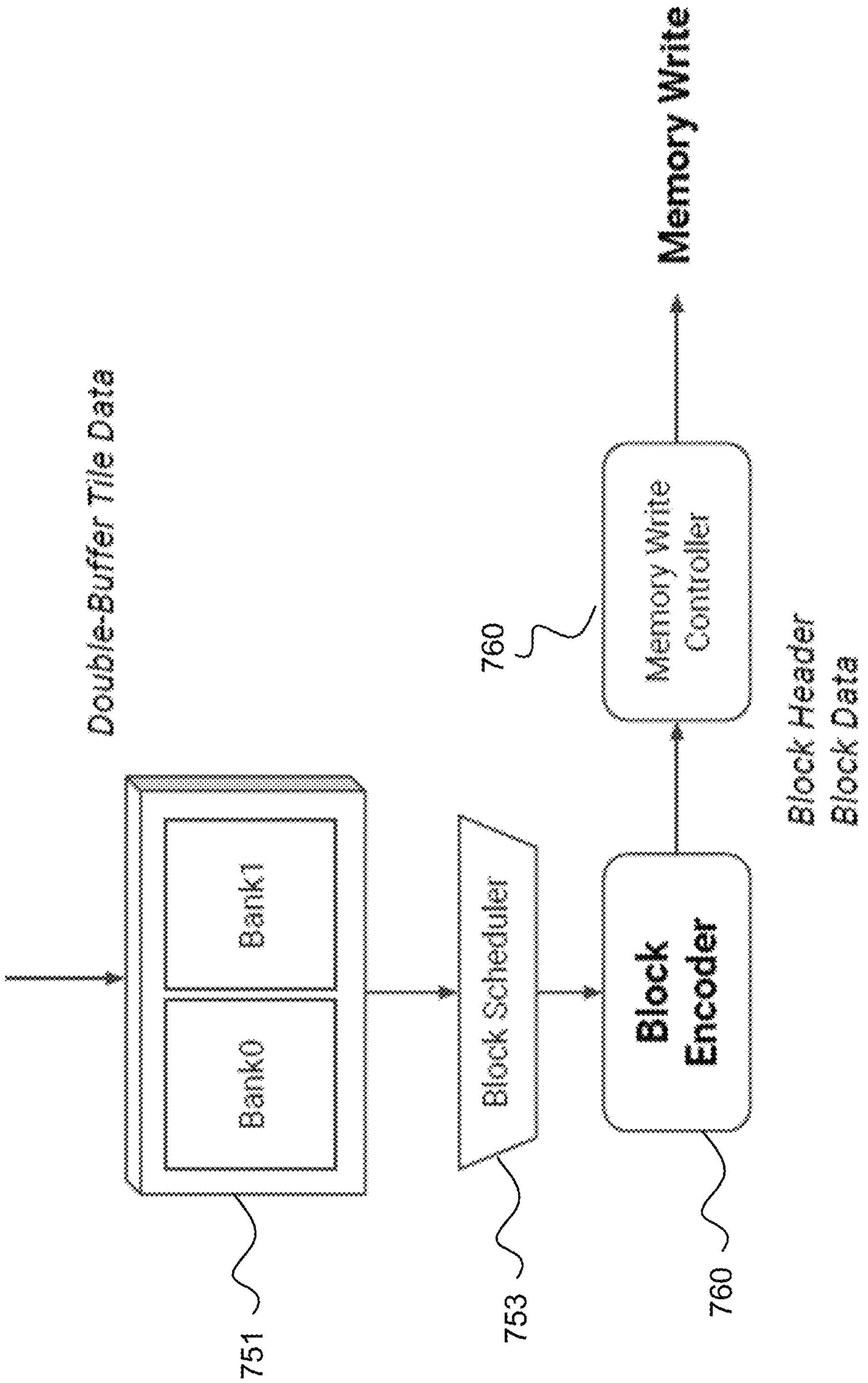
FIG. 7 illustrates an example encoding pipeline.
Figure 8:
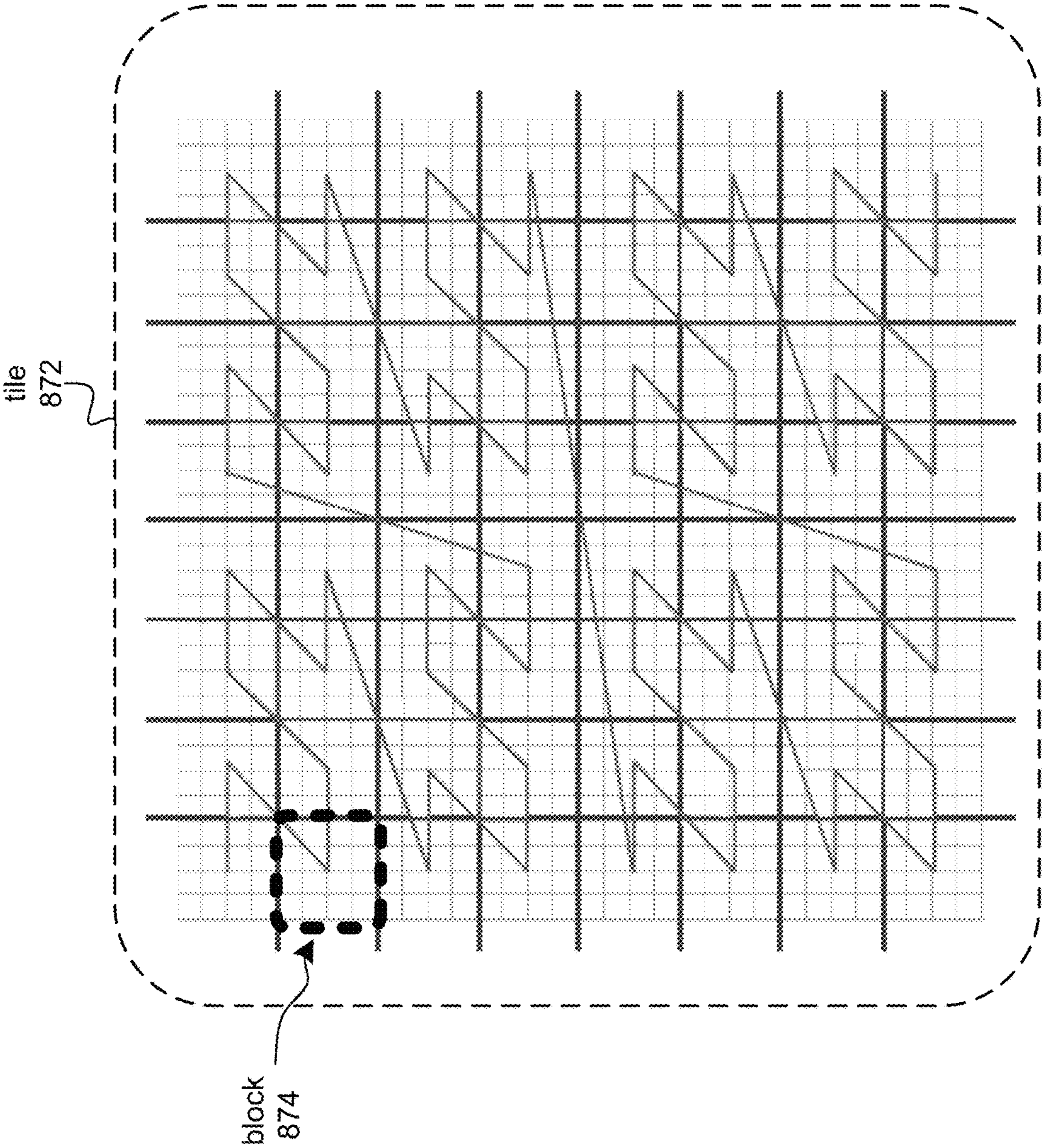
FIG. 8 illustrates a tile that is segmented into multiple blocks.

FIG. 7 illustrates an example encoding pipeline. Tiles that are encoded by the encoding system are piped through a double buffer 751 such that the current tile can be compressed while the next tile is streamed in. For each tile to be encoded, a block scheduler 753 may separate the tile into blocks for the encoder. A block scheduler 753 may schedule the blocks in an arrangement that is optimized for delta coding, for example, in an arrangement that minimizes the spatial distance between the blocks in a sequence. An example of such an arrangement is called the "Morton Order." FIG. 8 illustrates a tile 782 that is segmented into multiple blocks, e.g., block 874, each block comprising multiple pixels or texel, e.g., 4×4 pixels/texels. A block encoder 760 may be configured to encode blocks in a tile in an arrangement specified by a block scheduler. For a tile comprising pixels of multiple channels, or components, a block encoder 760 may be configured to encode each pixel channel separately. Examples of pixel channels or components are color components (e.g., R, G, B) or an opaque component (e.g., transparency). The encoded channels may then be collated into a single bitstream. The encoded data may be provided to a memory write controller 760. A memory write controller 760 may then send the encoded data to a memory to be stored and made accessible for later retrieval by a graphics engine.

Figure 9:
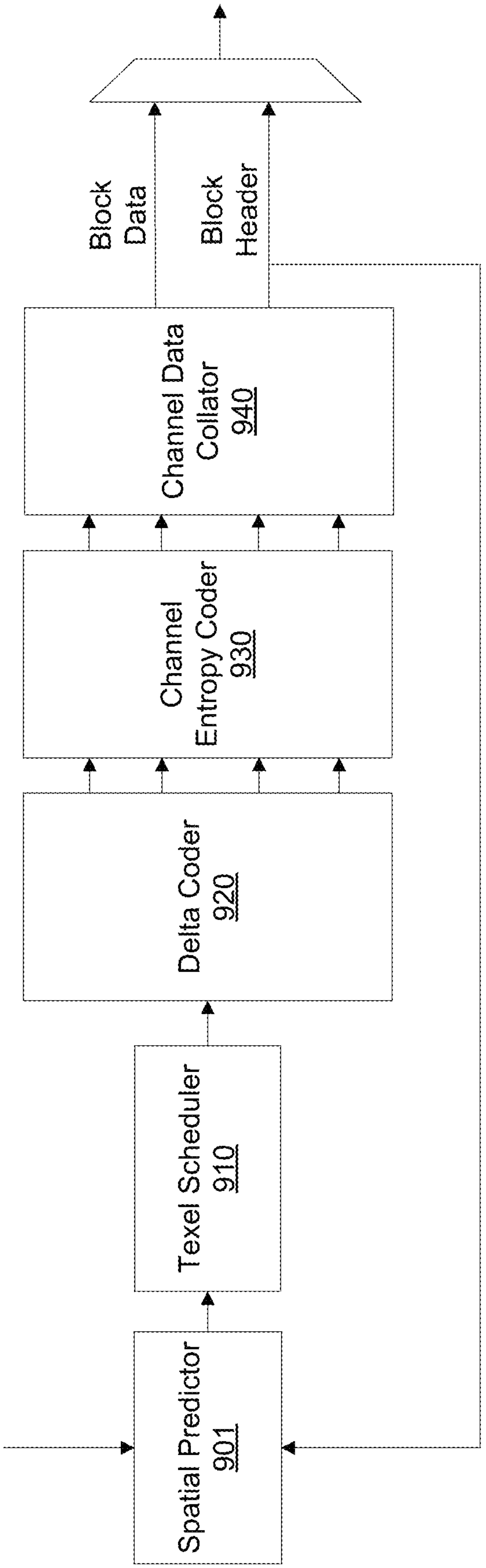
FIG. 9 illustrates an example encoding pipeline within a block encoder.

FIG. 9 illustrates an example encoding pipeline executed by a block encoder 760. In particular embodiments, a tile compress store 195 may be configured to encode an image based on groups of texels, each of which may be referred to as a "block." A block may be comprised of, e.g., 4×4 texels. A block encoder 760 may comprise a block analyzer 905, a spatial predictor 901, a texel scheduler 901, texel scheduler 910, delta coder 920, channel entropy coder 930, and channel data collator 940. In an embodiment, the encoding pipeline illustrated in FIG. 9 represents an encoding pipeline of a hardware encoder, but substantially similar pipeline may be implemented as a software encoder. Each of the system components illustrated in FIG. 9 may be configured to operate based on an encoding cycle where each system component processes one block per one encoding cycle.

In an embodiment, a spatial predictor 901 may be configured to compare the texel values of the current block to previously processed blocks, if any, to determine whether the texel values of the current block matches the texel values of any of the previously processed blocks. For example, a spatial predictor 901 may compare the texel values of the current block with the texel values of up to four of the previously processed blocks. If a matching block is found, the spatial predictor 901 may forgo encoding the texel block of the current block and instead assign a block header to the current block that matches a block header of the matching block. Such a technique allows a block encoder 760 to skip the encoding process for the current block since the duplication of the block header allows the matching block's compressed block data to be utilized for both the current block and the matching block. However, there is a power-efficiency concern with the above described technique because texel-by-texel comparison of blocks requires a significant amount of compute power and memory storage. As a solution, embodiments disclose a technique of generating a hash code, or hash representation, to represent the texel values of each block and using the hash codes to make the comparison rather than comparing the actual texel values of the blocks. In an embodiment, a block encoder 760 may be configured to generate hash representations that are 32-bits or 64-bits. Notably, a 32-bit or 64-bit block hash comparison is significantly cheaper, computationally, than comparing the 4×4 block data.

There exists yet another problem with the technique discussed above with reference to comparing the hash codes. As shown in FIG. 9, the encoding process involves several steps in a pipeline. The step of comparing the blocks (e.g., comparing hash codes) occurs at the first step, by a spatial predictor 901, but the encoding pipeline may be configured such that the block header for each block is generated at the end of the encoding process (e.g., by a channel data collator 940). This means that when a spatial predictor 901 compares a particular block to one of the previously processed blocks, the previously blocks may still be going through the encoding pipeline and their block header may not have been generated yet. In circumstances where a spatial predictor 901 finds a matching block but the block header has not been generated yet, a spatial predictor 901 may assign the current block a placeholder tag in place of a header, and a copy of the tag may be passed along the pipeline. Then, at the end of each encoding cycle (e.g., when a block is handed off to the next step in the encoding process), the block encoder 760 may check whether a previously-unavailable header is available, and if so, replaces the corresponding tag with the header. This solution prevents the encoding pipeline from being stalled due to certain headers not being available at the time a matching block is found.

Figure 10:
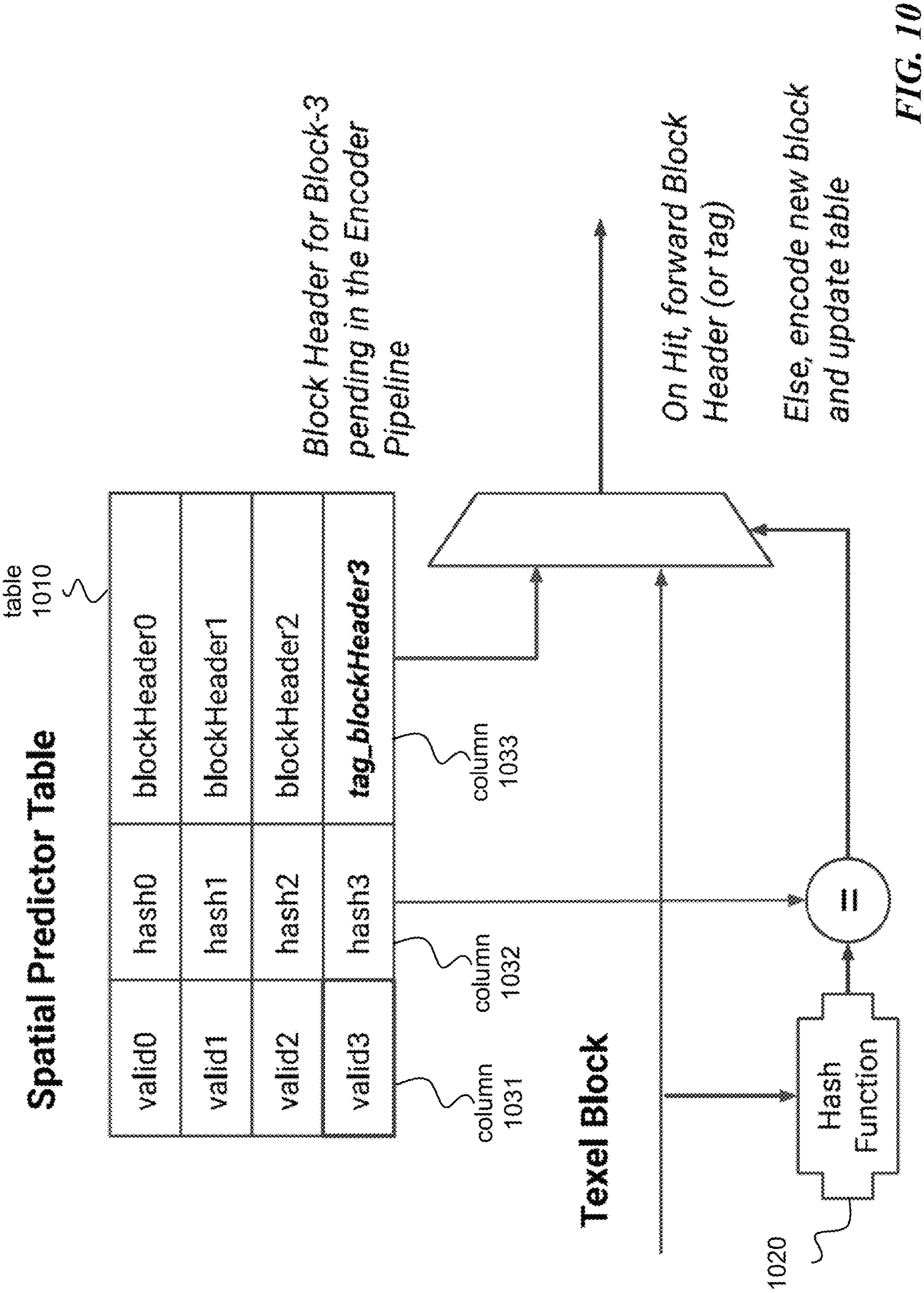
FIG. 10 illustrates an example of the techniques of a spatial predictor.

FIG. 10 illustrates an example of the techniques described above with reference to a spatial predictor 901. When a spatial predictor 901 processes a block, it may be configured to first analyze the texel values associated with the block to validate whether the block comprises valid texel values, as opposed to having no value or null value. If the block includes valid texel values, a spatial predictor 901 may be configured to generate a hash representation of the texel values associated with the block, via hash function 1020. Then, the spatial predictor 901 may be configured to compare the hash representation of the current block with the hash representation of blocks that were previously processed by the spatial predictor 901. If a match is found for the current block, a spatial predictor 901 may duplicate a block header for the current block that matches the block header of the matching block. For example, as illustrated in FIG. 8, a spatial predictor 901 may maintain a table 1010 comprising data associated with up to four previously processed blocks with respect to the current block. Such a table 1010 may be used to store data indicating whether a block is associated with valid texel values (e.g., in column 1031), hash representation of the texel values of the block (e.g., in column 1032), and block header or placeholder tag for the block (e.g., in column 1033). As noted above, if a matching block is found but the block header of the matching block has not been generated yet, a spatial predictor 901 may be configured to generate a placeholder tag, for example, "tag_blockHeader 3" in FIG. 8. A copy of such a tag may be sent along the encoding pipeline illustrated in FIG. 9. At the end of each encoding cycle, a spatial predictor 901 may be configured to determine whether the block header of the matching block is available, and if so, replace the tag with the appropriate block header. In an embodiment, if the current block being processed by a spatial predictor 901 matches one of the previously processed blocks, the current block may still be sent down the encoding pipeline due to the hardware configuration of the encoding pipeline. For example, the current block may still be sent to a texel scheduler 910, delta coder 920, channel entropy coder 930, and channel data collator 940, but text values of the block may not be processed by such system components. If the current block being processed by a spatial predictor 901 does not match one of the previously processed blocks, the current block may be sent down the encoding pipeline (in either hardware or software configurations) and the texel value of the block may be encoded according to embodiments disclosed herein. In an embodiment, a spatial predictor 901 may be configured to maintain a table 1010 based on a first-in-first-out (FIFO) protocol such that when the table is filled, the oldest entry is overwritten upon new incoming data. In a software implementation of the encoding pipeline, if the current block being processed by a spatial predictor 901 matches one of the previously processed blocks, the current block may not need to be passed through the encoding pipeline as is done with a hardware configuration, rather, rest of the encoding pipeline may be skipped. In particular embodiments, a block header specifies a memory region where the encoded block is stored. As such, when multiple blocks are encoded using the same header, a single encoded block data can be used for those multiple blocks.

Referring back to FIG. 9, after a spatial predictor 901 completes processing the current block, the current block may be passed onto the subsequent downstream components of the encoding pipeline. Examples of such downstream components of the encoding pipeline include a block analyzer 905, texel scheduler 910, delta coder 920, channel entropy coder 930, and channel data collator 940. Described below are techniques used by the downstream components to analyze and encode texel values of blocks.

In particular embodiments, a block analyzer 905 may be configured to analyze texel blocks and categorize them into one of two block variants: Flatblock or Codeblock. A block may be categorized as a Flatblock if all texels in the block have the same value. A block may be categorized as a Codeblock if some of the texels in the block have different values. Once a block is categorized as a Flatblock or a Codeblock, a block analyzer 905 may be configured to pass the block to a texel scheduler 910.

In particular embodiments, a texel scheduler 910 may be configured to schedule the texels in a block (e.g., Codeblock) in a sequence optimized for delta encoding. For example, the texels in a block may be scheduled in a Morton Order shown in FIG. 8. The arranged texels may then be provided to a delta coder 920. A texel scheduler 910 may be configured to schedule the texels of a Codeblock and, but not for a Flatblock since delta coding is not necessary for a Flatblock.

In particular embodiments, a delta coder 920 may be configured to encode a texel block using various techniques. For a Flatblock, a delta coder 920 may be configured encode the block using a single texel value since a Flatblock contains only a single texel value. For a Codeblock having multiple texel channels (e.g., R, G, B, opacity), a delta coder 920 may be configured to encode each texel channel separately from each other, and different encoding techniques may be used to encode each channel. The different encoding techniques used by a delta coder 92 may include a "flat" technique, "variable-length" technique, and an uncompressed technique which essentially involves "encoding" (e.g., storing) texel values as uncompressed. These encoding techniques may also be referred to as compression modes, for example, "variable length" mode, "flat" mode, or uncompressed mode. A particular channel of a Codeblock may be encoded using a "flat" technique if all of the values of the texels in the channel are the same. The flat technique involves using a single value to represent the entire channel. A particular channel of a Codeblock may be encoded using a "variable-length" technique if values of the texels within the channel differ from each other. The variable-length technique is a novel compression technique that produces different sizes of encoded data depending on the differences in the texel values within the block. As for the uncompressed technique, while it may involve storing the corresponding pixel values as uncompressed (e.g., without any compression), for the purposes of describing the embodiments herein, the uncompressed technique/mode may still be referred to as one of the "compression" techniques/modes used to "encode" texel values of a texel block, and its operations may be described as the process of "compressing" the texel values.

Figure 11:
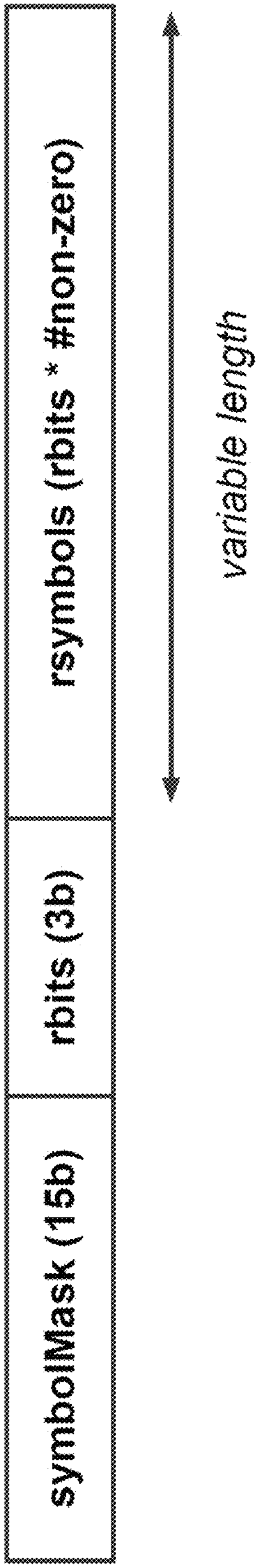
FIG. 11 illustrates an example a compressed channel of texel values.

In particular embodiments, the variable-length technique may involve generating three groups of data to represent the encoded texel values: "symbolmask"; "rbits"; "rsymbols." Data group rsymbols is used to represent the non-zero delta values of the texel values as arranged by a texel scheduler 910 (e.g., in a Morton Order). For example, if there are 16 texel values in a sequence, there would be 15 delta values, each delta value representing the difference of one texel value to the next in that sequence, or the difference of one texel value to the previous texel value in that sequence if considering how the sequence of texel values may be read by a block encoder 760. Data group rsymbols is used to represent only the non-zero delta of those 15 delta values. Data group symbolmask is used to provide a 1 to 1 mapping of the delta values that indicates whether each delta value is a zero value or non-zero value. Data group rbits is used to indicate the maximum number of bits required to represent each of the delta values, along with an additional bit to indicate whether the delta values are positive or negative values. In other words, rbits may be used to indicate the width of a symbol (e.g., a symbol being a delta value), and rbits may be referred to as a "symbol width." FIG. 11 illustrates an example of what a compressed channel of texel values would look like when symbolmask, rbits, and rsymbols are continuously packed. As indicated in FIG. 11, in particular embodiments, the variable-length technique may be configured to produce variable length of bits for rsymbols while symbolmask and rbits may each be configured with a fixed number of bit lengths that are determined prior to the encoding process. For example, if a block comprises 4×4 texels (16 texel values), a block encoder 760 may be configured to assign symbolmask a bit length of 15 bits since there would be 15 delta values. As for rbits, a block encoder 760 may be configured to assign rbits a bit length that is required to represent the magnitude of the delta values along with one additional bit to represent whether a particular delta value is a positive or negative value.

Figure 12:
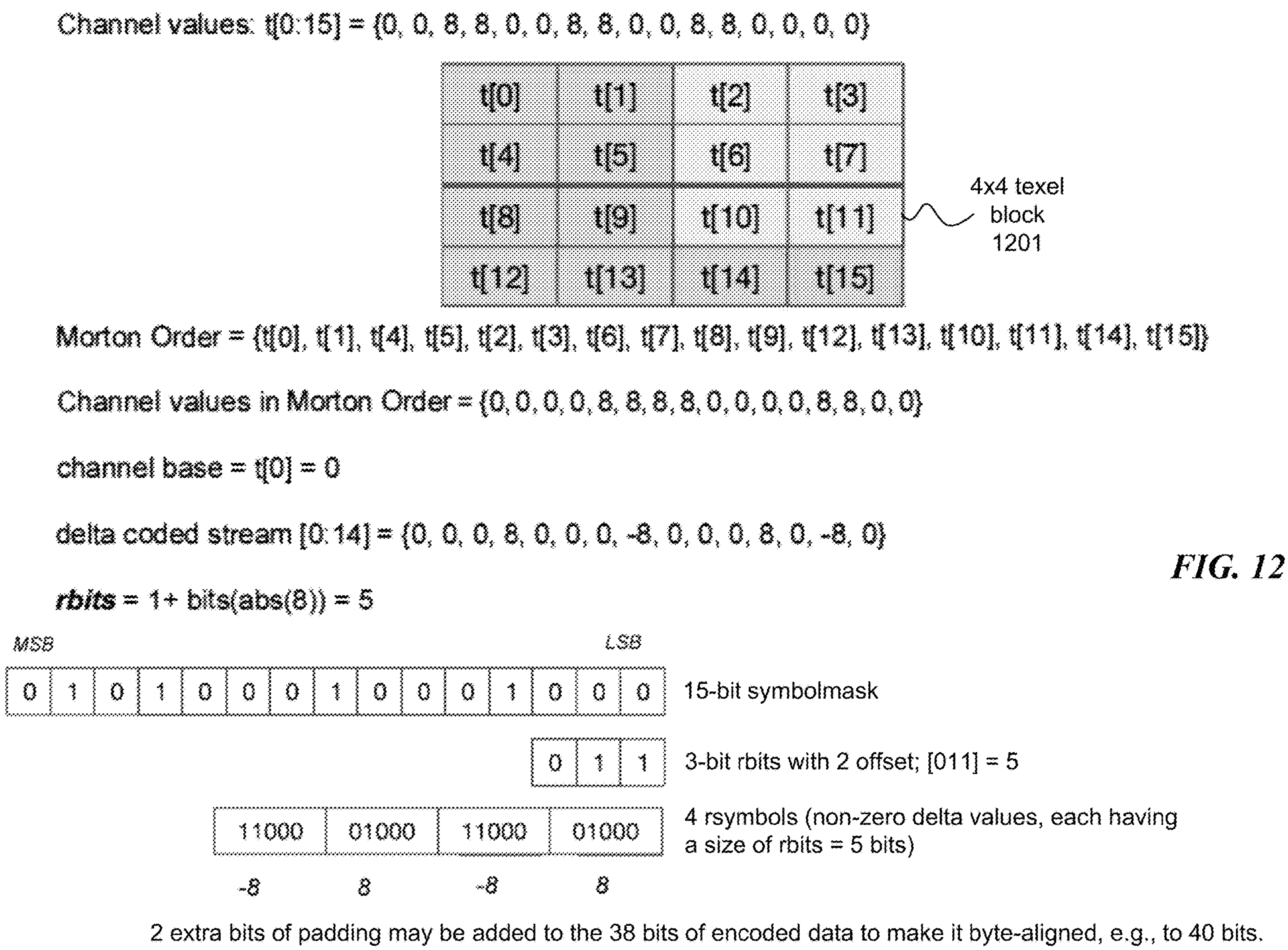
FIG. 12 illustrates an example diagram for encoding a 4×4 texel block using a variable-length technique.

FIG. 12 illustrates an example diagram for encoding a 4×4 texel block using a variable-length technique. Specifically, FIG. 12 illustrates a 4×4 texel block 872 comprising 16 texel values, which when arranged in a Morton Order are as follows: [0, 0, 0, 0, 8, 8, 8, 8, 0, 0, 0, 0, 8, 8, 0, 0]. The delta values, or delta coded stream, of the texel values arranged in the Morton Order would have 15 values and are as follows: [0, 0, 0, 8, 0, 0, 0, −8, 0, 0, 0, 8, 0, −8, 0]. The rbits for these delta values would be 5 since a bit length of 5 (i.e., 5 bits) would be required to represent each of the delta values, a first bit to indicate a positive or negative sign of the delta values and four additional bits to represent the delta values' maximum value of 8. In an embodiment, the rbits may be encoded in a binary representation, such that rbits of 5 may be stored as [101]. In some embodiments, rbits may be stored with an offset, for example, with an offset of 2 such that rbits of 5 may be stored as 3, or [011]. Storing rbits with an offset increases the range of the values that rbits can represent and leverages the fact that rbits of 0 or 1 would not be needed because, for example, the maximum number of bits required to represent each of the delta values, which is what rbits represents, would always require a value greater than 0 or 1. Continuing the example illustrated in FIG. 12, the rsymbols for the delta values would be [−8, 8, −8, 8] or in binary representation [11000, 01000, 11000, 01000], where each value of rsymbols has a bit length of rbits (5 bits) with a first bit used to indicate whether the delta value is a positive or negative value and four additional bits to represent the magnitude of the delta values. The symbolmask for the delta values would be [0, 1, 0, 1, 0, 0, 0, 1, 0, 0, 0, 1, 0,0, 0] with the most significant bit ("MSB") placed to the left side and the least significant bit ("LSB") placed on the right side. In FIG. 12, this sequence of values of symbolmask is presented in a reverse order with respect to how the delta values were presented in the previous steps. As discussed above, symbolmask are used to indicate whether a delta value is zero or non-zero. Notably, the data group rsymbols only needs to represent non-zero delta values since any zero delta values are already indicated by symbolmask. In addition to the three groups of data, the first value of the uncompressed texel values may be encoded as the "base value" of the encoded data, either encoded together with the three groups of data or separately as metadata. In the example above, the base value would be 0 since that is the first value of the uncompressed texel values. Once all three groups of data are generated for a texel block, they may be collated together into a stream of bits, for example, in the configuration shown in FIG. 11. The collated stream of bits represents the encoded data for a particular channel of a texel block. In an embodiment, a block metadata that is encoded with the encoded data may comprise data indicating the number of texel channels included in a block and the type of technique used to each of the channels. In an embodiment, extra bits may be encoded into the encoded data to make it byte-aligned. For example, as shown in FIG. 12, if the encoded data results in a bit length of 38 bits, two extra bits may be added to make it byte-aligned (e.g., multiples of 8 bits).

As discussed above, each texel channel within a Codeblock may be independently encoded using any of the techniques described above (e.g., flat technique, variable-length technique, or uncompressed). For example, for a Codeblock having three channels of texel values, a first channel of the three may be encoded using a flat technique, a second channel of the three may be encoded using the variable-length technique, and a third channel of the three may be stored as uncompressed.

In particular embodiments, after encoding a channel using the variable-length technique, a channel entropy coder 930 illustrated in FIG. 9 may be configured to evaluate whether the encoded channel data is computationally more expensive than the uncompressed channel data, that is, whether the encoded data requires more bits than the uncompressed data. If so, the channel entropy coder may disregard the encoded channel data and instead use the uncompressed channel data. In other words, for each channel/component of a texel block, a channel entropy coder 930 may determine whether to encode the texel values for that channel using one of the compression techniques disclosed above or based on the uncompressed texel values. In particular embodiments, a channel entropy coder 930 may evaluate the encoded block data of the Codeblock to see whether the encoded data is greater in size than the uncompressed size of the block, that is, whether the encoded data requires more bits than uncompressed data. If so, the encoding system may be configured to (1) disregard the encoded block data of the Codeblock, (2) recategorize the Codeblock as a third block variant referred to as a Rawblock, and (3) store the uncompressed block data in lieu of the disregarded encoded data. The encoding system stores a Rawblock without any compression. The size of a Rawblock represents the maximum size of a stored block. In an embodiment, a channel entropy coder 930 may be configured to evaluate the entirety of a block to categorize the block into one of the variants described above, meaning that, if a block includes multiple texel components, all texels within the block are evaluated without separately evaluating texels of different components. For example, a block comprising multiple channels of texels may be categorized as a Flatblock only if all texels within the block have the same value, including texels of different components. Alternatively, if any texel values differ in a block, even across different channels, the block may be categorized as a Codeblock. Examples of texel components, or channels, include color components (e.g., R, G, B) or an opaque component (e.g., transparency).

In particular embodiments, a channel data collator 940 may be configured to collate each of the encoded, or uncompressed, channels of texel values into a bit stream that results in the encoded block data. In particular embodiments, a channel data collator 940 may generate a block header for each texel block. A block header may comprise a pointer (e.g., an offset value) that indicates the location of the block data in the memory that is relative to block data associated other blocks of an image. A block header may comprise data that indicates whether the encoded texel block is compressed or uncompressed, the number of texel channels in the block, and if the block is compressed, the size or length of the compressed block data (e.g., measured in bits or bytes). In particular embodiment, as shown in FIG. 9, once a block header is generated for a texel block, the block header may be provided to a spatial predictor 901. The spatial predictor 901 may then evaluate whether any texel block is associated with a placeholder tag that has been generated in place for the block header, and if so, replace the placeholder tag with the block header.

The encoding pipeline illustrated in FIG. 9 provides a unique way of encoding the blocks that allows a decoder to selectively retrieve and decode any particular block of the encoded blocks independently from other encoded pixel blocks. More specifically, each block is encoded in a way that it is self-contained, meaning that a decoder can selectively retrieve and decompress a particular block simply based on the data contained within the block. For example, if a PNG image that encoded using the techniques described herein, a decoder may be able to retrieve and decompress specific portions of the PNG image independently from other portions of the PNG image.

In particular embodiments, a blit and filtering unit 180 may be configured to retrieve static graphics content from a memory database 109 and, if necessary, perform decoding operations and/or transformation or filtering operations on the graphics content referred to as a "blit" operation. A blit operation refers to a hardware feature that moves a rectangular block of bits from main memory into display memory. In particular embodiments, a graphics system disclosed herein may store static graphic content, such as pre-rendered images (e.g., emoji), in a memory 109 that is external to the graphics engine. A blit and filtering unit 180 may be configured to retrieve content from the memory and perform transformation or filtering operations, then provide the transformed/filtered content to a color buffer. In particular embodiments, a blit and filtering unit 180 may be configured to update the input data based on the command it receives from a tile controller 120. A blit and filtering unit 180 may include a memory structure, for example, a single color buffer. Incoming source image information per tile may be buffered in this memory structure to improve the performance of the blit and filtering unit 180. A blit and filtering unit 180 may perform a set of predefined operations and filters. A blit and filtering unit 180 provides a power-performance-area (PPA) optimized solution to some common data rearrangement/movement (with filter) operations to the hardware. In particular embodiments, a blit and filtering unit 180 may comprises a decoder configured to decode static graphics content that has been encoded and stored in a memory database 109. A blit and filtering unit 180 may be configured to provide the decoded graphics content to a color buffer 191, 193.

Figure 13:
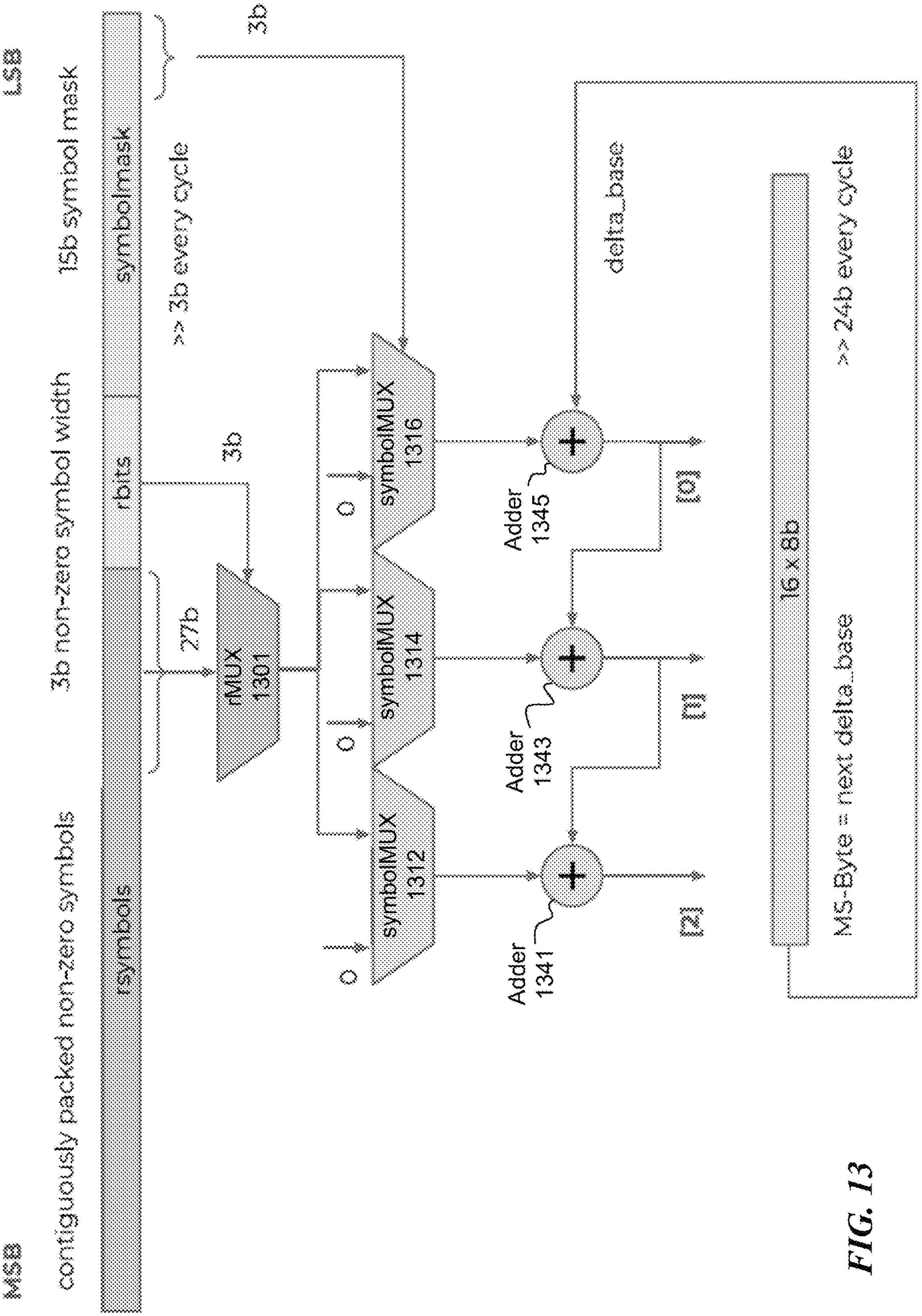
FIG. 13 illustrates an example technique of decoding a 4×4 texel block that has been encoded by a block encoder.

FIG. 13 illustrates an example technique of decoding a 4×4 texel block that has been encoded by a block encoder 760. Specifically, FIG. 13 illustrates an encoded texel data comprising three data groups, rsymbols, rbits, and symbolmask. As discussed above, data group rsymbols is used to represent the non-zero delta values of the sequence of texel values of a block as arranged in, for example, a Morton Order. Data group symbolmask is used to provide a 1 to 1 mapping of the delta values that indicates whether each delta value is a zero value or non-zero value. Data group rbits is used to indicate the maximum number of bits required to represent each of the delta values, along with an additional bit to indicate whether the delta values are positive or negative values. In an embodiment, a decoder may be configured to decode multiple delta values per one decoding cycle. For example, FIG. 13 illustrates an embodiment where three multiplexers, i.e., symbolMUX 1312, 1314, 1316, are configured to decode three segments of rsymbols (delta values) in parallel during each decoding cycle. Although FIG. 13 illustrates an embodiment where three segments of rsymbols are decoded per each decoding cycle, any number of segments may be configured to be decoded per each cycle, for example, five segments of rsymbols in parallel. While FIG. 13 illustrates one instance of a decoding operation for a particular channel of texel values, multiple of such instances may be configured to be implemented such that all texel channels are decoded in parallel. Once all channels are decoded, the decoded values may be collated, resulting in uncompressed texel values.

In the embodiment illustrated in FIG. 13, for example, a decoder may be configured to decode a 4×4 texel block having rbits of 8, which indicates that each segment of rsymbols (e.g., each delta value) is 8 bits long. Given that the decoder is configured to decode three delta values in parallel, rMUX 1301 may be configured to fetch up to three delta values per decoding cycle, that is, up to 27 bits at a time. In an embodiment, a decoder may be configured to implement an initializing operation where symbolmask is parsed to determine the number of delta values rMUX that should be fetched in each decoding cycle. For example, if the first three symbolmask bits are, indicating that the first and third values are non-zero values and the second is a zero value, then rMUX 1301 may be configured to fetch two segments of rsymbols for the first decoding cycle (first two delta values). Also during the first decoding cycle, the first three symbolmask bits may be provided to symbolMUX 1312, 1314, or 1316, respectively. For each zero value, a corresponding symbolMUX (e.g., symbolMUX 1312, 1314, or 1316) may be configured to pass a zero value to the next component in the decoder, for example, to a corresponding adder 1341, 1343, or 1345. For each non-zero value, a corresponding MUX (e.g., symbolMUX 1312, 1314, or 1316) may be configured to fetch a non-zero segment of rsymbols (delta value). For example, if the first three symbolmask bits are such that 1 is provided to symbolMUX 1316, 0 is provided to symbolMUX 1314, and 1 is provided to symbolMUX 1312, then symbolMUX 1316 may fetch the first non-zero delta value from rMUX 1301, symbolMUX 1312 may fetch the second non-zero delta value from rMUX 1301, and a zero value may be passed through symbolMUX 1314. Once the first three delta values are retrieved by the respective symbolMUX 1312, 1314, and 1316 (whether non-zero or zero), the delta values may be passed to the respective adders 1341, 1343, and 1345. Then, a decoder may be configured to add the base value of the encoded data to the first delta value to determine the second texel value, add the resulting value to the second delta value to determine the third texel value, then add the resulting value to the third delta value to determine the fourth texel value. In such a fashion, the first four texel values of the encoded data may be determined after the first decoding cycle, the first texel value being the base value. The next three texel values may similarly be decoded during a second decoding cycle, and additional decoding cycles may further be implemented until the block is decoded completely.

Figure 14:
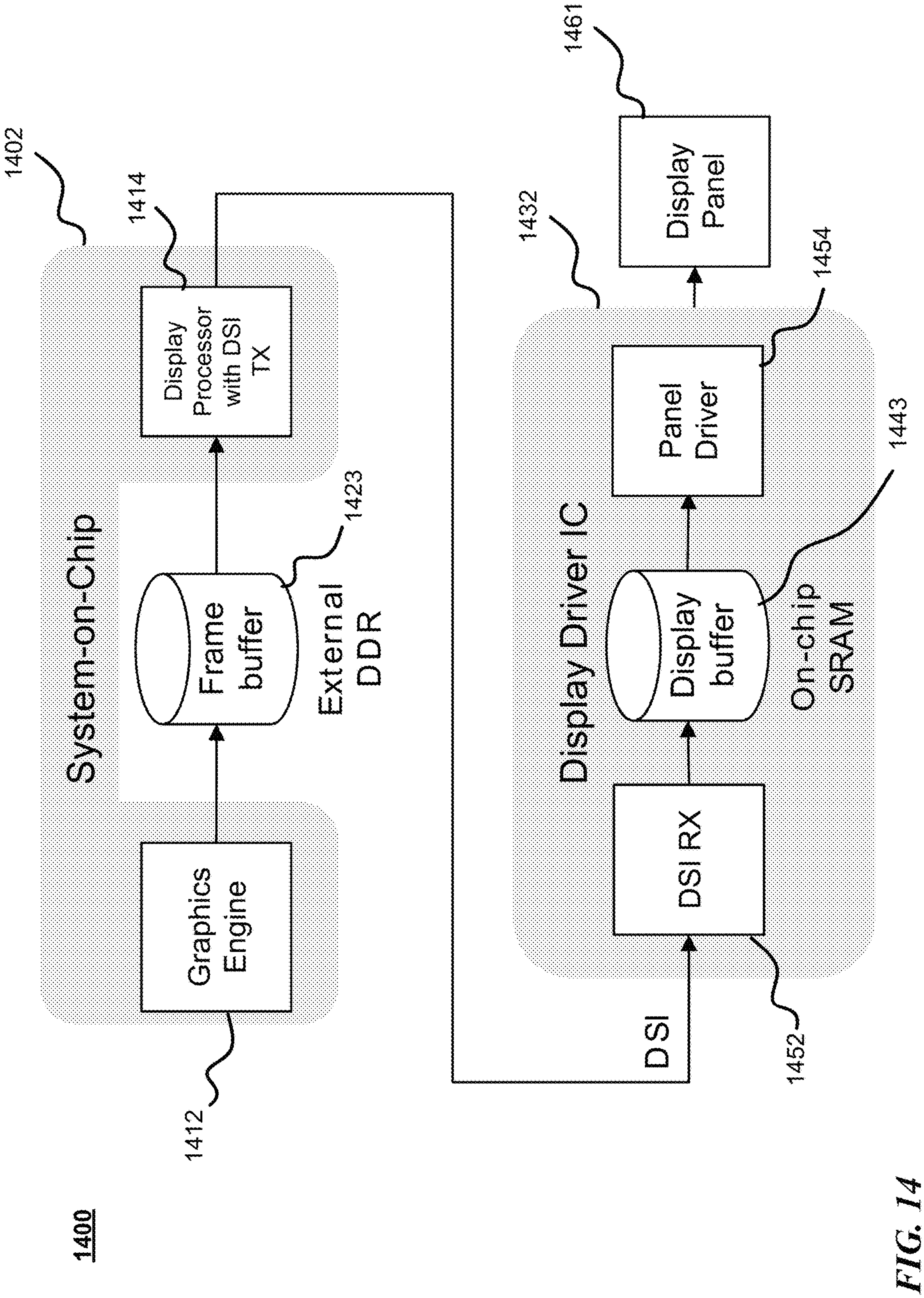
FIG. 14 illustrates an example system architecture of a graphics pipeline.

FIG. 14 illustrates an example system architecture of a graphics pipeline. In particular embodiments, a graphics pipeline 1400 includes a system-on-chip ("SoC") 1402 that comprises a graphics engine 1412 configured to render a frame and a display processor 1414 configured to transmit out the rendered frame. In such embodiments, the frame that is rendered by the graphics engine 1412 may be stored in a buffer 1423 that is external to the SoC 1402, for example, in an external DDR. The display processor 1414 may be configured to read out the rendered frame from the frame buffer 1423. The display processor 1414 may also be configured with a transmitter (TX), for example, a display serial interface (DSI) transmitter, which may be used to transmit the rendered frame to a display driver IC ("DDIC") 1432. A DDIC may comprise a receiver (RX), for example, a DSI receiver 1452, which may be used to receive the rendered frame from a SoC 1402. A DDIC 1432 may also comprise a frame buffer 1443 that is configured store the rendered frame, for example, a frame buffer (e.g., SRAM) that is configured on-chip of the DDIC 1432. A DDIC 1432 may also comprise a panel driver 1454 that is configured to read the rendered frame in the frame buffer 1443 and transmit it to the display panel 1461. In particular embodiments, the SoC 1402 may be configured to execute a decision logic that is used to determine when the rendered frame should be sent out to the DDIC 1432. This decision logic is not the focus of this application, and thus, any technique known in the art may be used to determine when the rendered frame should be sent out to the DDIC 1432.

As a way of definition, a single frame comprises multiple tiles, each tile being comprised of pixels.

Figure 15:
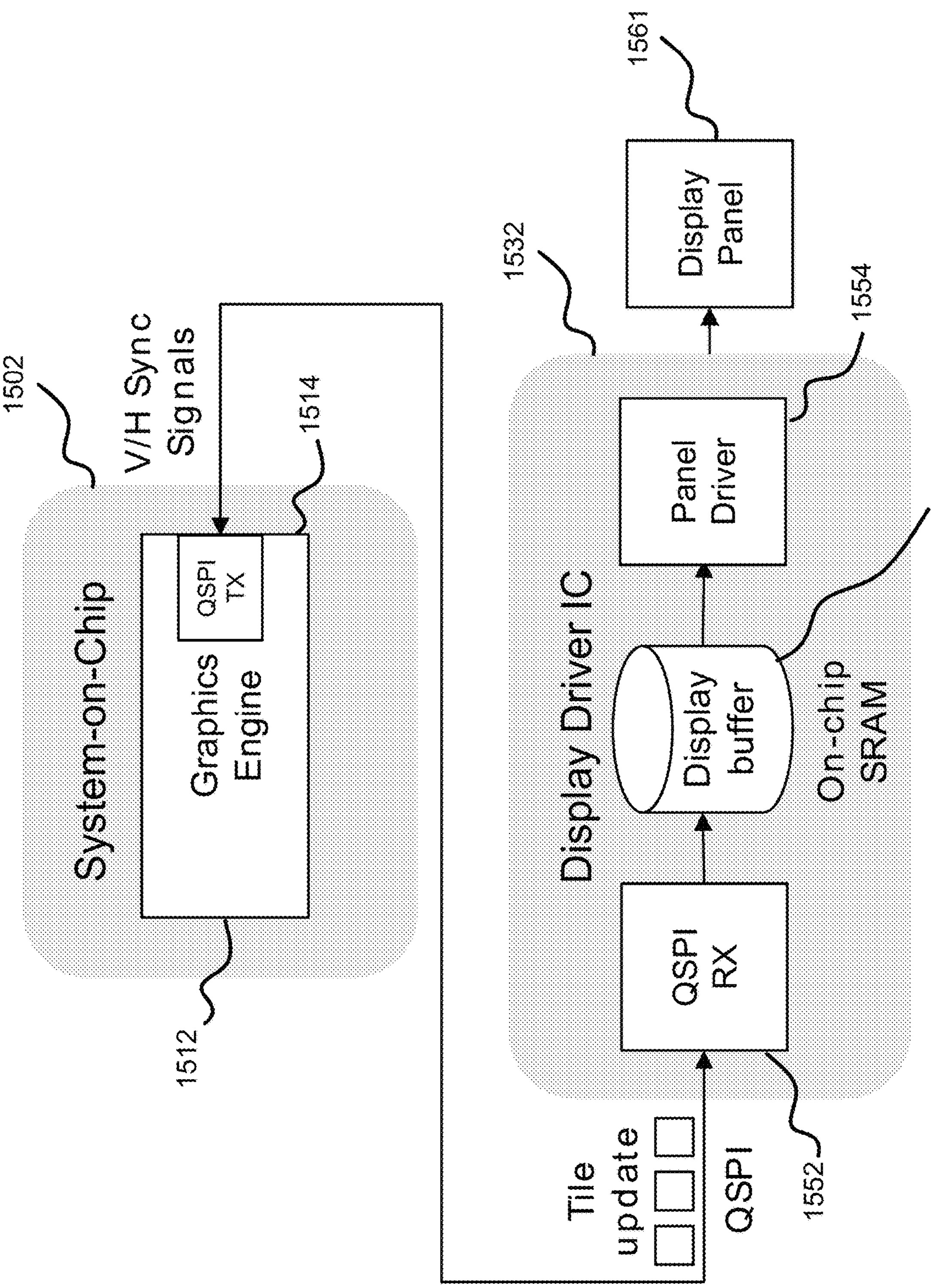
FIG. 15 illustrates another example system architecture of a graphics pipeline.
Figure 16:
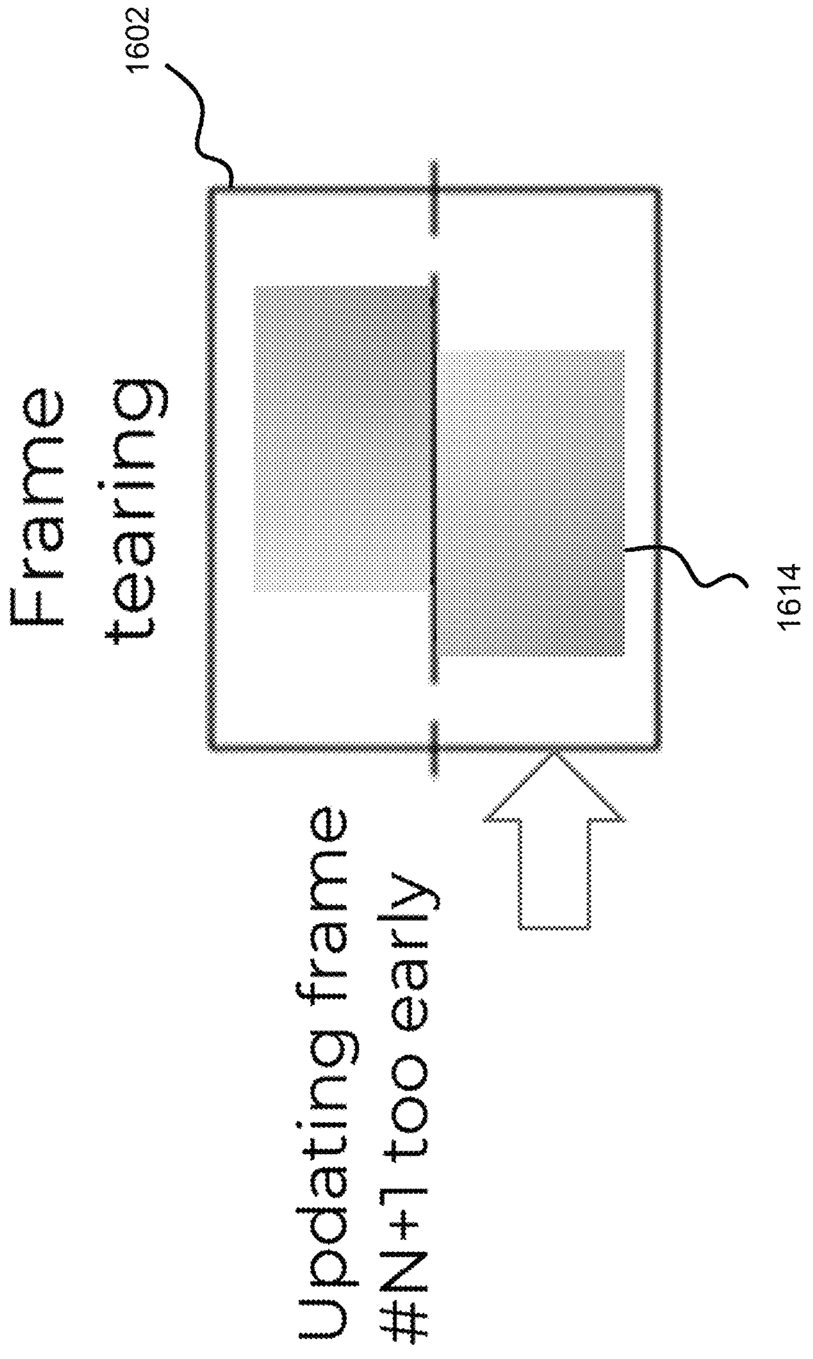
FIG. 16 illustrates an exemplary scenario where a portion of a frame is updated too quickly, causing a tearing effect.

FIG. 15 illustrates another example system architecture of a graphics pipeline. In particular embodiments, a graphics pipeline 1500 includes a system-on-chip ("SoC") 1502 that comprises a graphics engine 1512 configured to selectively render tiles of a frame and a transmitter 1514 configured to transmit out the rendered tiles. In contrast to the architecture 1400 shown in FIG. 14, the SoC 1502 of FIG. 15 does not store the rendered frames in a memory external to the SoC 1502. Instead, the SoC 1502 comprises an intermediary buffer, internally housed within the SoC 1502, which is used to temporarily store data corresponding to tiles while the tiles are being rendered. In an embodiment, the intermediary buffer is configured with limited capacity (e.g., data corresponding to a small number of tiles, such as two tiles), which contrasts with the frame buffer 1443 of SoC 1402 illustrated in FIG. 14, which is configured with relatively greater capacity (e.g., data corresponding to a full frame, or multiple frames). Furthermore, the graphics pipeline 1500 further contrasts the graphics pipeline 1400 in that the decision logic be used to determine when the rendered frame should be sent out to the DDIC 1432 is not longer used in the graphics pipeline 1500. Instead, the SoC 1502 determines when certain tiles should be rendered, and once such tiles are rendered, they are sent directly to the DDIC. This scheme, however, may present a problem because the DDIC reads the rendered data from the display buffer at a particular speed without regard to some decision logic. In other words, the DDIC lacks the capability of checking whether the frames/tiles in the display buffer have been already read/processed, meaning, if the graphics engine updates the display buffer too quickly, some of the rendered frame/tiles may be overwritten prematurely (e.g., before being read), resulting in tearing artifacts. For example, FIG. 16 illustrates an exemplary scenario where a portion 1614 of a frame 1602 is updated too quickly, causing a tearing effect. To address this problem, the Application herein discloses a novel technique implemented by the SoC 1502 to throttling the rendering of the tiles to ensure that the display buffer 1543 is updated with rendered data at appropriate times.

In particular embodiments, the graphics engine 1512 may be configured to render tiles only when it knows that the new content has been readout by the display buffer (i.e., the buffer 1543 in the DDIC). To achieve this feat, the graphics engine 1512 uses the display's V/H sync signals to determine when a tile in the display buffer has been consumed. Horizontal Synchronization, or Hsync is a signal that is used to synchronize the start of the horizontal line scan of a frame, where the horizontal line scan corresponds to a single row of pixels in the frame. Vertical Synchronization, or Vsync, is similar to Hsync but is used to synchronize the start of the horizontal line scan of the next frame. In other words, H-sync signals get sent at the start of every line, whereas the V-sync signal gets sent at the end of a frame. H-sync signals can therefore be used to output pixels row-by-row of previously rendered tiles that are stored in the intermediate buffer or used to wait until it has passed a tile boundary, and then output the entire row of tiles. The V-sync signal can be used to trigger the rendering and/or sending of all subsequent tiles in the frame.

In an embodiment, the graphics engine 1514 receives the V/H sync signals from the DDIC 1532 and uses the signals to determine that certain rendered data has been read out by the display and delays the rendering process until such determination has been made, effectively throttling the rendering process and mitigating risk of the premature overwriting of the rendered data. For example, when the graphics engine 1514 first initiates rendering a series of tiles, the graphics engine 1514 may render the first row of pixels of the first tile, then wait to render the next row of pixels until it receives a Hsync signal from the DDIC 1532, in which case the graphics engine 1514 is able to determine that the first row of the tile has been read by the display. In some embodiments, multiple rows of a tile may be rendered at once, in which case, the graphics engine 1514 may be configured to receive multiple, respective Hsync signals before rendering the next set of rows. Continuing the example, when the graphics engine 1514 receives a Vsync signal, it is able to determine that the current frame has been fully read and the display is about to read the next frame. In this circumstance, the graphics engine 1514 may be configured to render all remaining tiles in the current frame given that the graphics engine 1514 is able to determine that the current frame has been fully read by the display. In one embodiment, the graphics engine 1514 may determine the number of subsequent tiles to render based on variety of factors, including but not limited to the speed at which the display reads the rendered content stored in the display buffer and/or the size of the frame or tiles.

In particular embodiments, the graphics engine determines which tiles to selectively render based on differential changes of content across the frames. The graphics engine maintains tile information of each of the tiles in a frame, which is then used to track the primitives shown in the frame. And thus, for example, if the graphics engine determines that a new primitive was introduced in a frame, the graphics engine can identify particular tiles that are covering the new primitive and render only those tiles and not the rest of the tiles in a frame.

The embodiments shown in FIG. 15 allows significant reduction in power consumption by removing a frame buffer (e.g., frame buffer 1443) and associated decision logic from the graphics pipeline. In an embodiment, the reduction of power consumption resulting from the embodiment shown in FIG. 15 may allow certain displays to be always on. For example, a digital watch face utilizing the embodiment of FIG. 15 may be configured with an always-on display even though the watch may be configured with a battery with relatively small capacity.

Figure 17:
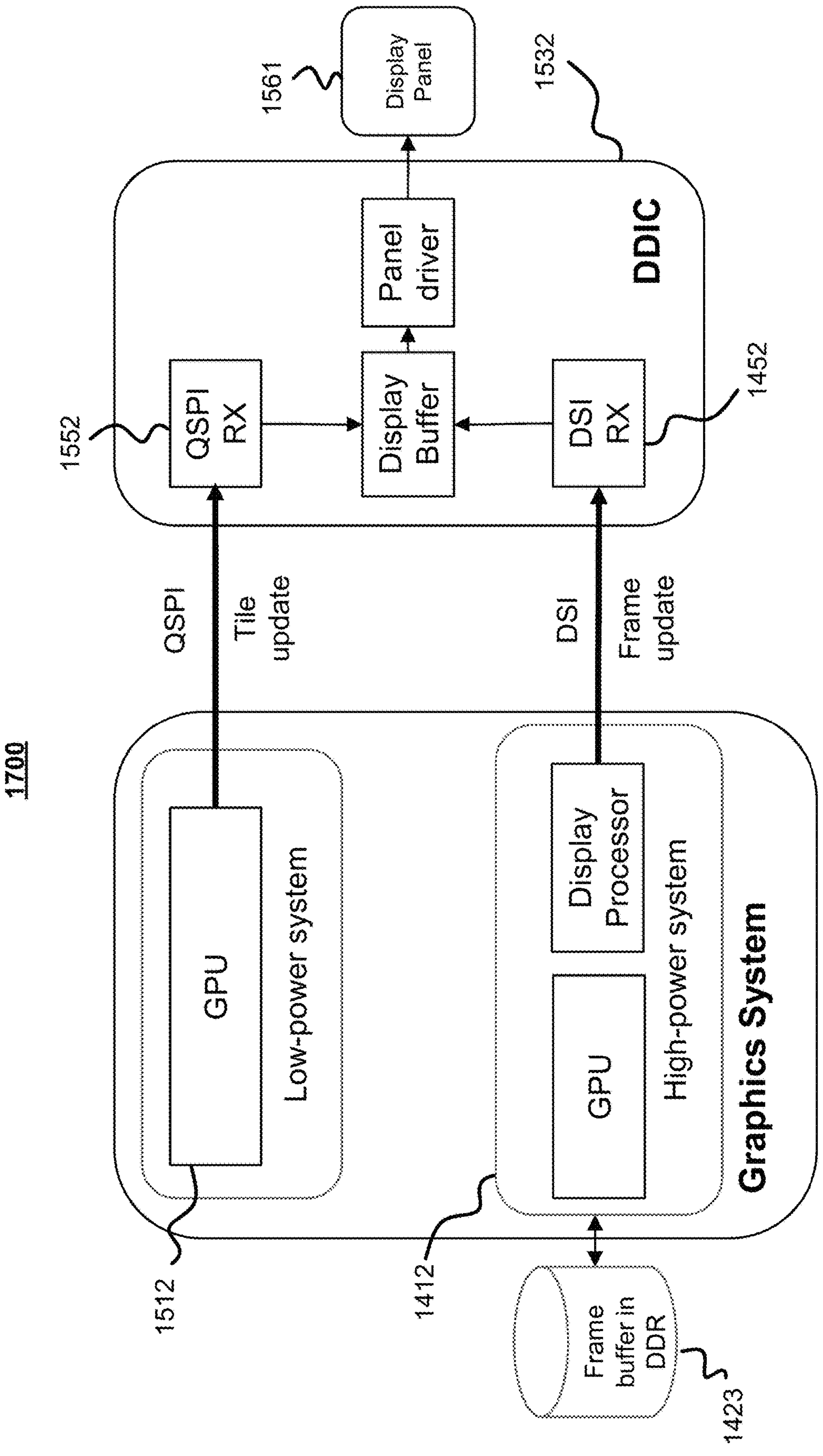
FIG. 17 illustrates yet another example system architecture of a graphics pipeline.

FIG. 17 illustrates yet another example system architecture of a graphics pipeline. Embodiments illustrated in FIG. 17 combine the embodiments illustrated in FIG. 14 and FIG. 15. The embodiments illustrated in FIG. 14 includes a graphics engine (GPU) 1412 that may be configured as part of a high-power system that utilizes higher amount of power, whereas the embodiments illustrated in FIG. 15 includes a graphics engine (GPU) 1512 that may be configured as part of a low-power system that utilizes lower amount of power relative to its counterpart in FIG. 14. In particular embodiments, the graphics pipeline 1700 may be configured to implement the low-power system when the display is operating in an "always-on" state where the display stays on indefinitely until instructed to change its state. Alternatively, the graphics pipeline 1700 may be configured to implement the high-power system whenever the display is not in the always-on state or otherwise require frequent updates to the displayed content. As a way of example and not intended to be limiting, the graphics pipeline 1700 may be configured with a digital watch, and the always-on state may be used to show the watch face (e.g., that tells the time), which may only require infrequent updates as minutes go by. The graphics pipeline 1700 may implement the high-power system when running other functionalities of the digital watch that requires frequent updates (e.g., displaying health application that shows a user's real-time heart rate; media playback).

Figure 18:
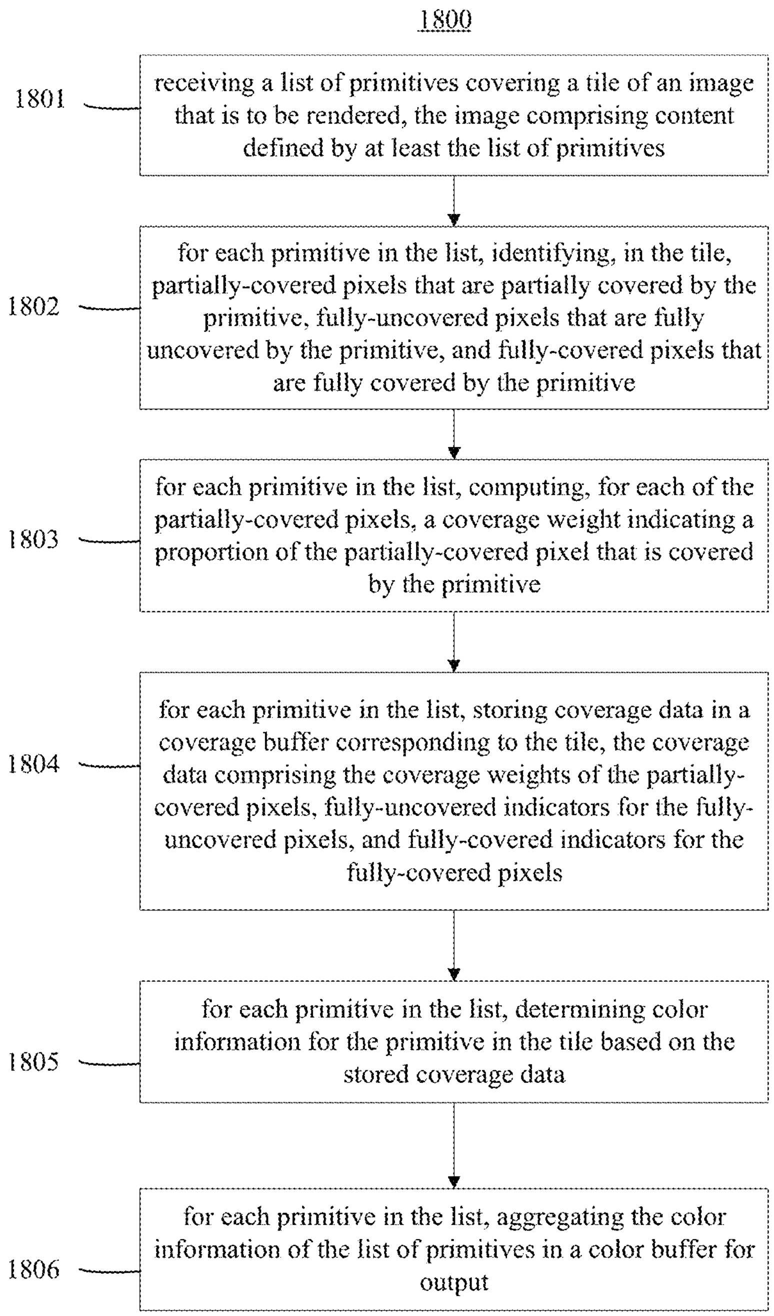
FIG. 18 illustrates an example method for determining the color information of primitives in an image base in part by determining the coverage weight of each pixel in the image.

FIG. 18 illustrates a method 1800 for determining the color information of primitives in an image base in part by determining the coverage weight of each pixel in the image. The method may begin at step 1801 by receiving a list of primitives covering a tile of an image that is to be rendered, the image comprising content defined by at least the list of primitives. At step 1802, the method may continue by, for each primitive in the list, identifying, in the tile, partially-covered pixels that are partially covered by the primitive, fully-uncovered pixels that are fully uncovered by the primitive, and fully-covered pixels that are fully covered by the primitive. At step 1803, the method may continue by, for each primitive in the list, computing, for each of the partially-covered pixels, a coverage weight indicating a proportion of the partially-covered pixel that is covered by the primitive. At step 1804, the method may continue by, for each primitive in the list, storing coverage data in a coverage buffer corresponding to the tile, the coverage data comprising the coverage weights of the partially-covered pixels, fully-uncovered indicators for the fully-uncovered pixels, and fully-covered indicators for the fully-covered pixels. At step 1805, the method may continue by, for each primitive in the list, determining color information for the primitive in the tile based on the stored coverage data. At step 1806, the method may continue by, for each primitive in the list, aggregating the color information of the list of primitives in a color buffer for output. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for determining the color information of primitives in an image, this disclosure contemplates any suitable method for determining the color information of primitives in an image including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Figure 19:
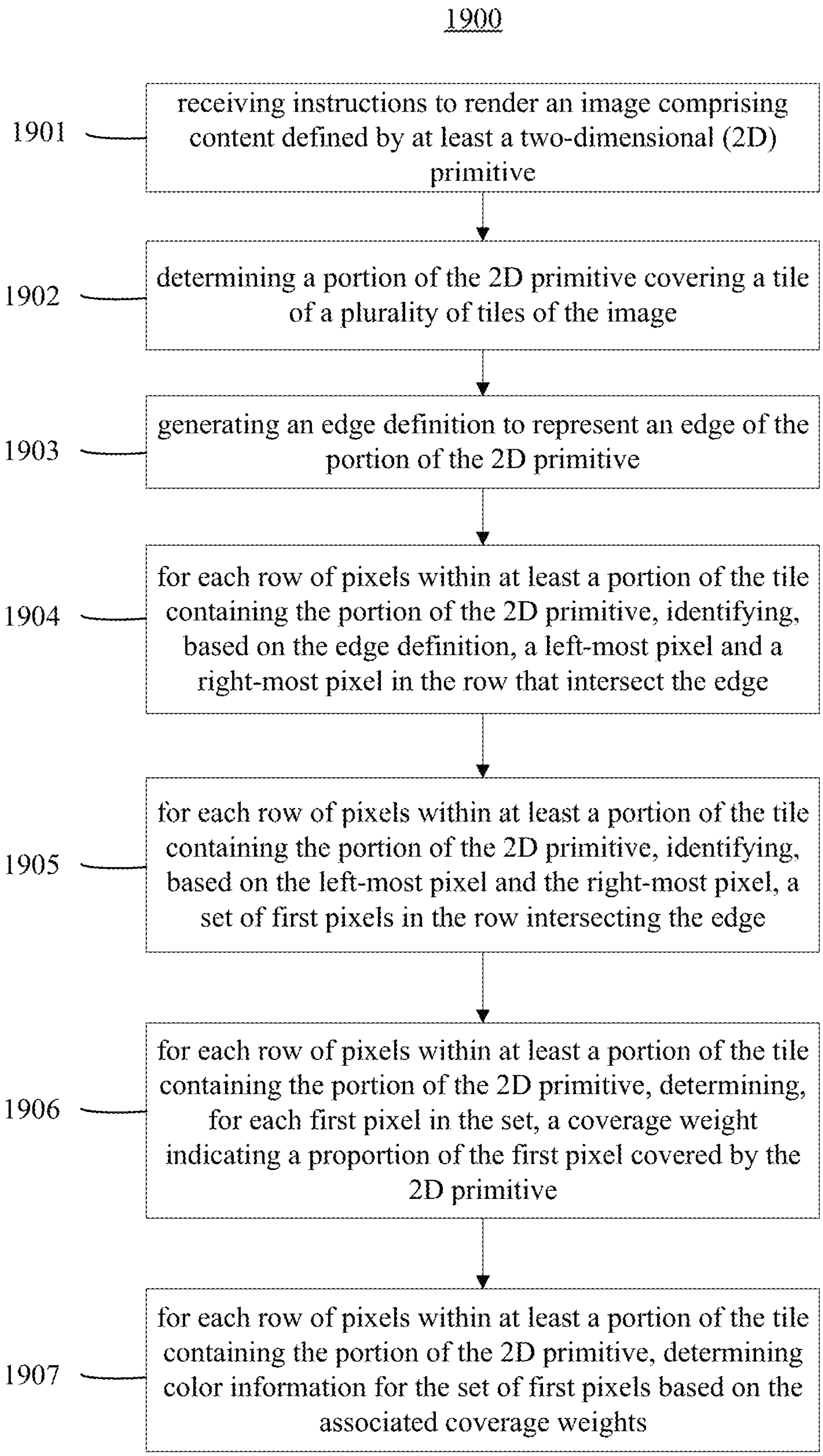
FIG. 19 illustrates an example method for determining the color information of a primitive base in part by determining the coverage weight of each pixel of primitive based on function equations representing the edges of the primitives.

FIG. 19 illustrates an example method 1900 for determining the color information of a primitive base in part by determining the coverage weight of each pixel of primitive based on function equations representing the edges of the primitives. The method may begin at step 1901 by receiving instructions to render an image comprising content defined by at least a two-dimensional (2D) primitive. At step 1902, the method may continue by determining a portion of the 2D primitive covering a tile of a plurality of tiles of the image. At step 1903, the method may continue by generating an edge definition to represent an edge of the portion of the 2D primitive. At step 1904, the method may continue by, for each row of pixels within at least a portion of the tile containing the portion of the 2D primitive, identifying, based on the edge definition, a left-most pixel and a right-most pixel in the row that intersect the edge. At step 1905, the method may continue by, for each row of pixels within at least a portion of the tile containing the portion of the 2D primitive, identifying, based on the left-most pixel and the right-most pixel, a set of first pixels in the row intersecting the edge. At step 1906, the method may continue by, for each row of pixels within at least a portion of the tile containing the portion of the 2D primitive, determining, for each first pixel in the set, a coverage weight indicating a proportion of the first pixel covered by the 2D primitive. At step 1907, the method may continue by, for each row of pixels within at least a portion of the tile containing the portion of the 2D primitive, determining color information for the set of first pixels based on the associated coverage weights. Particular embodiments may repeat one or more steps of the method of FIG. 19, where appropriate. Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates an example method for determining the color information of a primitive, this disclosure contemplates any suitable method for determining the color information of a primitive including any suitable steps, which may include all, some, or none of the steps of the method of FIG. 19, where appropriate. Furthermore, although this disclosure describes and illustrates particular components, devices, or systems carrying out particular steps of the method of FIG. 19, this disclosure contemplates any suitable combination of any suitable components, devices, or systems carrying out any suitable steps of the method of FIG. 19.

Figure 20:
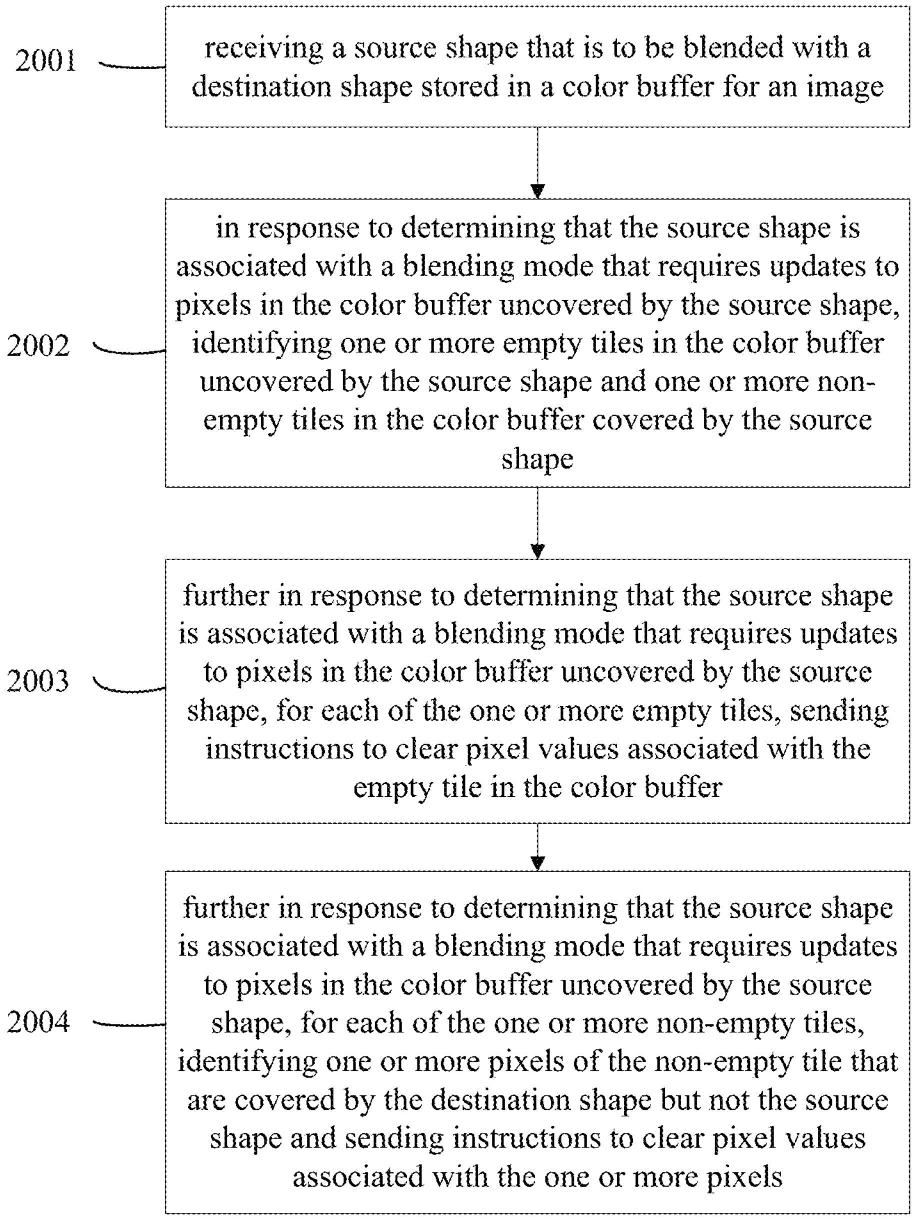
FIG. 20 illustrates an example method for blending source shape with a destination shape using a blending mode that requires updates to pixels in the color buffer uncovered by the source shape.

FIG. 20 illustrates an example method 2000 for blending source shape with a destination shape using a blending mode that requires updates to pixels in the color buffer uncovered by the source shape. The method may begin at step 2001 by receiving a source shape that is to be blended with a destination shape stored in a color buffer for an image. The following steps are performed in response to determining that the source shape is associated with a blending mode that requires updates to pixels in the color buffer uncovered by the source shape. At step 2002, the method may continue by identifying one or more empty tiles in the color buffer uncovered by the source shape and one or more non-empty tiles in the color buffer covered by the source shape. At step 2003, the method may continue by, for each of the one or more empty tiles, sending instructions to clear pixel values associated with the empty tile in the color buffer. At step 2004, the method may continue by, for each of the one or more non-empty tiles, identifying one or more pixels of the non-empty tile that are covered by the destination shape but not the source shape and sending instructions to clear pixel values associated with the one or more pixels. Particular embodiments may repeat one or more steps of the method of FIG. 20, where appropriate. Although this disclosure describes and illustrates particular steps of the method of FIG. 20 as occurring in a particular order, this disclosure contemplates any suitable steps of the method of FIG. 20 occurring in any suitable order. Moreover, although this disclosure describes and illustrates an example method for blending source shape with a destination shape using a blending mode that requires updates to pixels in the color buffer uncovered by the source shape, this disclosure contemplates any suitable method for blending source shape with a destination shape using a blending mode that requires updates to pixels in the color buffer uncovered by the source shape including any suitable steps, which may include all, some, or none of the steps of the method of FIG. 20, where appropriate. Furthermore, although this disclosure describes and illustrates particular components, devices, or systems carrying out particular steps of the method of FIG. 20, this disclosure contemplates any suitable combination of any suitable components, devices, or systems carrying out any suitable steps of the method of FIG. 20.

Figure 21:
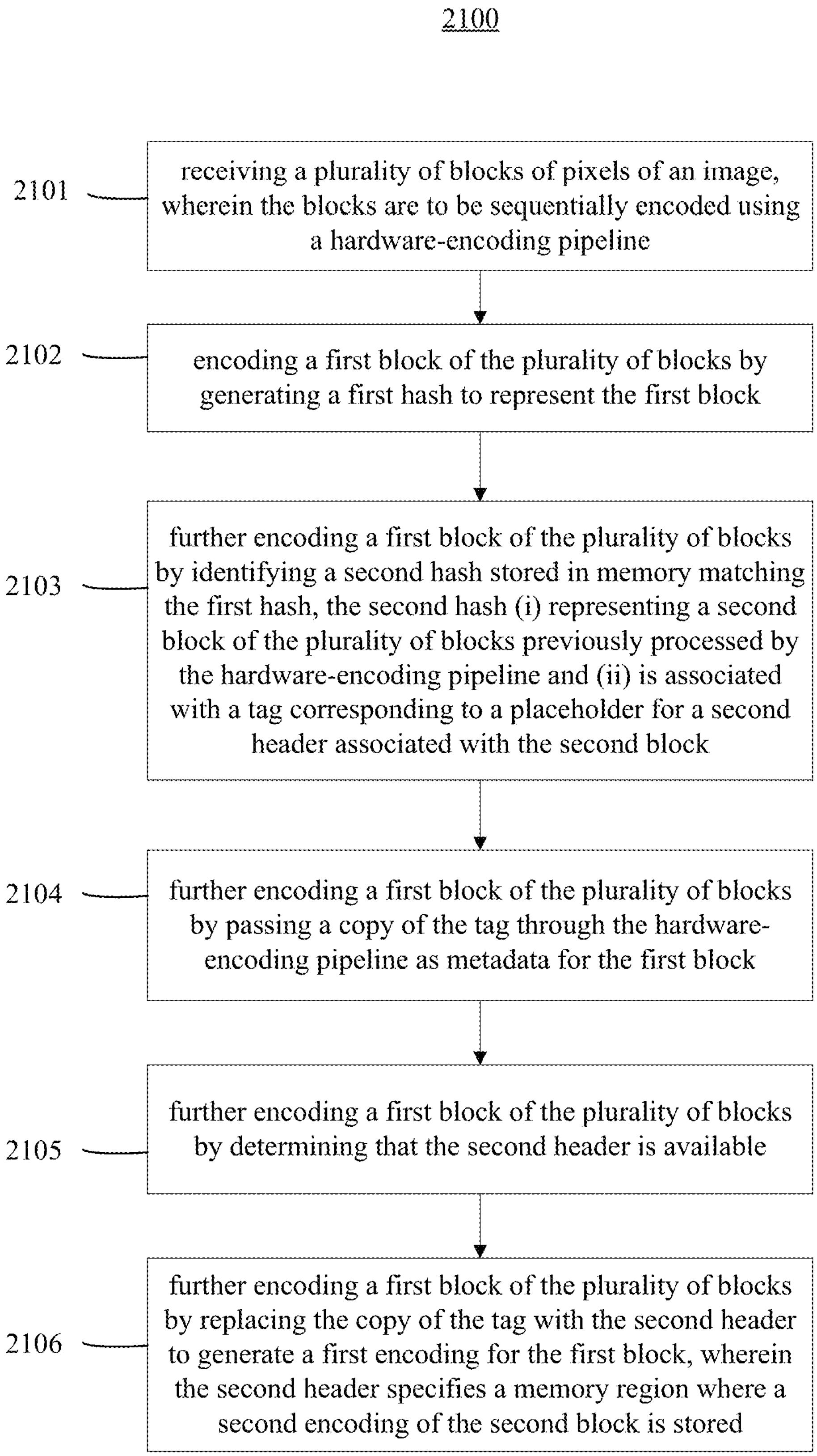
FIG. 21 illustrates an example method for encoding blocks of pixels based on a tag that is used to temporary represent block headers.

FIG. 21 illustrates an example method 2100 for encoding blocks of pixels based on a tag that is used to temporary represent block headers. The method may begin at step 2101 by receiving a plurality of blocks of pixels of an image, wherein the blocks are to be sequentially encoded using a hardware-encoding pipeline. At steps 2102-2106, the method may continue by encoding a first block of the plurality of blocks. Specifically, at step 2102, the method may continue by generating a first hash to represent the first block. At step 2103, the method may continue by identifying a second hash stored in memory matching the first hash, the second hash (i) representing a second block of the plurality of blocks previously processed by the hardware-encoding pipeline and (ii) is associated with a tag corresponding to a placeholder for a second header associated with the second block. At step 2104, the method may continue by passing a copy of the tag through the hardware-encoding pipeline as metadata for the first block. At step 2105, the method may continue by determining that the second header is available. At step 2106, the method may continue by replacing the copy of the tag with the second header to generate a first encoding for the first block, wherein the second header specifies a memory region where a second encoding of the second block is stored. Particular embodiments may repeat one or more steps of the method of FIG. 21, where appropriate. Although this disclosure describes and illustrates particular steps of the method of FIG. 21 as occurring in a particular order, this disclosure contemplates any suitable steps of the method of FIG. 21 occurring in any suitable order. Moreover, although this disclosure describes and illustrates an example method for encoding blocks of pixels based on a tag that is used to temporary represent block headers, this disclosure contemplates any suitable method for encoding blocks of pixels based on a tag that is used to temporary represent block headers including any suitable steps, which may include all, some, or none of the steps of the method of FIG. 21, where appropriate. Furthermore, although this disclosure describes and illustrates particular components, devices, or systems carrying out particular steps of the method of FIG. 21, this disclosure contemplates any suitable combination of any suitable components, devices, or systems carrying out any suitable steps of the method of FIG. 21.

Figure 22:
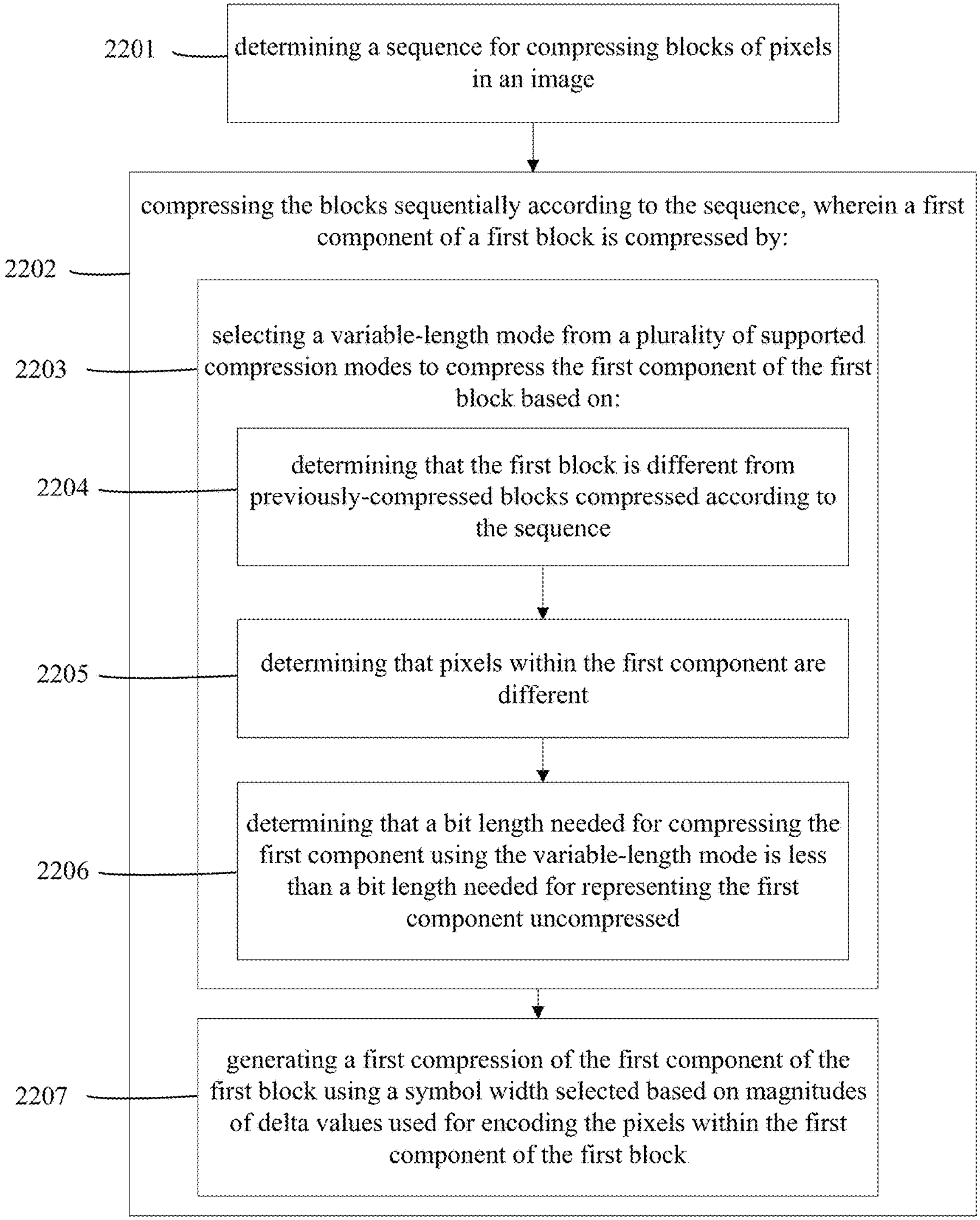
FIG. 22 illustrates an example method for determining whether a block of pixels is different from previously-compressed blocks and compressing the block using a variable-length technique.

FIG. 22 illustrates an example method 2200 for determining whether a block of pixels is different from previously-compressed blocks and compressing the block using a variable-length technique. The method may begin at step 2201 by determining a sequence for compressing blocks of pixels in an image. At step 2202, the method may continue by compressing the blocks sequentially according to the sequence, wherein a first component of a first block is compressed, details of which are laid out in steps 2203 and 2207. At step 2203, the method may continue by selecting a variable-length mode from a plurality of supported compression modes to compress the first component of the first block, which is based on steps 2204-2206. At step 2204, the method may continue by determining that the first block is different from previously-compressed blocks compressed according to the sequence. At step 2205, the method may continue by determining that pixels within the first component are different. At step 2206, the method may continue by determining that a bit length needed for compressing the first component using the variable-length mode is less than a bit length needed for representing the first component uncompressed. At step 2207, the method may continue by generating a first compression of the first component of the first block using a symbol width selected based on magnitudes of delta values used for encoding the pixels within the first component of the first block. Particular embodiments may repeat one or more steps of the method of FIG. 22, where appropriate. Although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates an example method for determining whether a block of pixels is different from previously-compressed blocks and compressing the block using a variable-length technique, this disclosure contemplates any suitable method for determining whether a block of pixels is different from previously-compressed blocks and compressing the block using a variable-length technique including any suitable steps, which may include all, some, or none of the steps of the method of FIG. 22, where appropriate. Furthermore, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Figure 23:
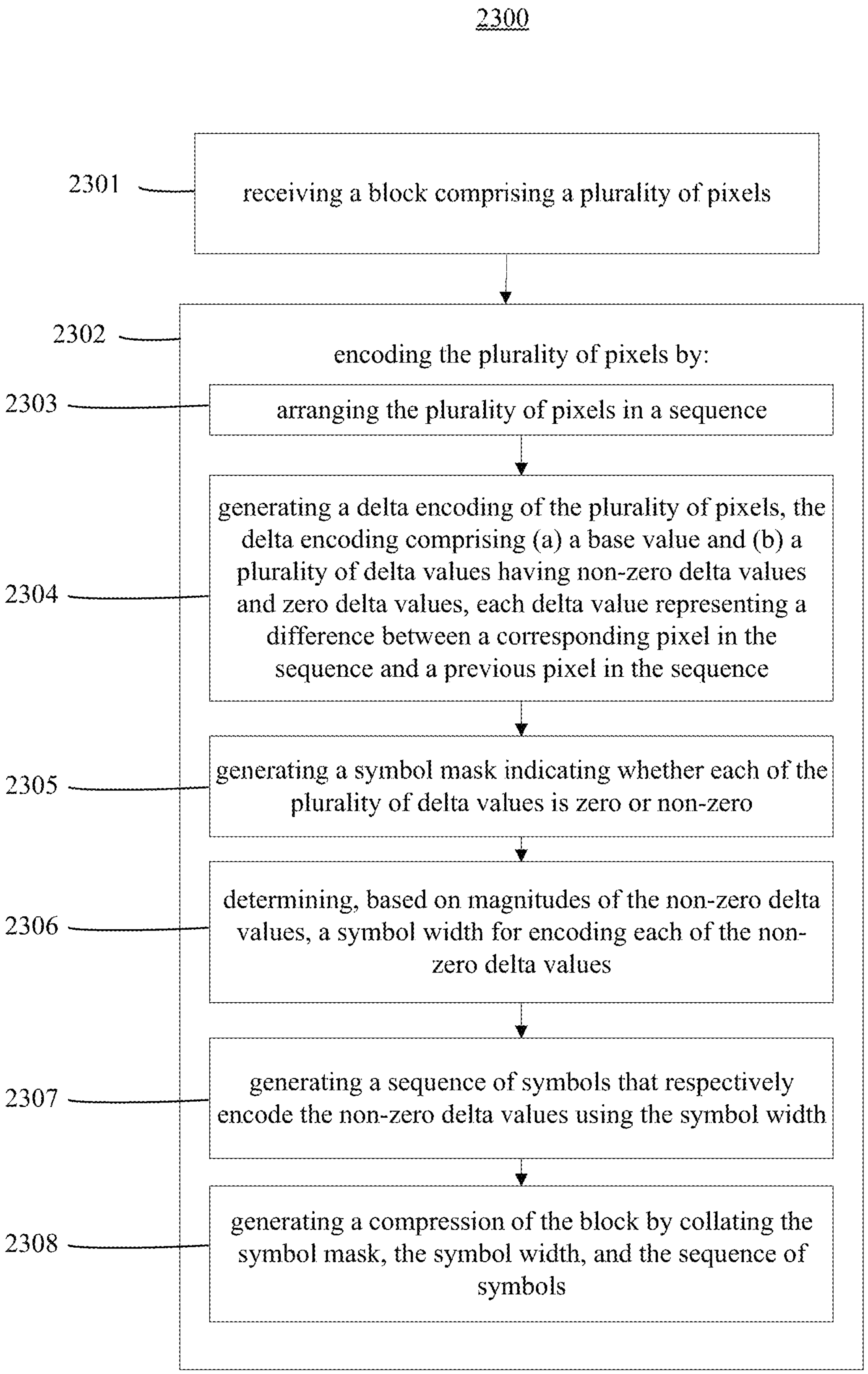
FIG. 23 illustrates an example method for encoding a plurality of pixels based on delta encoding that utilizes a base value, symbol mask, symbol width, and sequence of symbols.

FIG. 23 illustrates an example method 2300 for encoding a plurality of pixels based on delta encoding that utilizes a base value, symbol mask, symbol width, and sequence of symbols. The method may begin at step 2301 by receiving a block comprising a plurality of pixels. At step 2302, the method may continue by encoding the plurality of pixels, details of which are laid out in steps 2303-2308. At step 2303, the method may continue by arranging the plurality of pixels in a sequence. At step 2304, the method may continue by generating a delta encoding of the plurality of pixels, the delta encoding comprising (a) a base value and (b) a plurality of delta values having non-zero delta values and zero delta values, each delta value representing a difference between a corresponding pixel in the sequence and a previous pixel in the sequence. At step 2305, the method may continue by generating a symbol mask indicating whether each of the plurality of delta values is zero or non-zero. At step 2306, the method may continue by determining, based on magnitudes of the non-zero delta values, a symbol width for encoding each of the non-zero delta values. At step 2307, the method may continue by generating a sequence of symbols that respectively encode the non-zero delta values using the symbol width. At step 2308, the method may continue by generating a compression of the block by collating the symbol mask, the symbol width, and the sequence of symbols. Particular embodiments may repeat one or more steps of the method of FIG. 23, where appropriate. Although this disclosure describes and illustrates particular steps of the method of FIG. 23 as occurring in a particular order, this disclosure contemplates any suitable steps of the method of FIG. 23 occurring in any suitable order. Moreover, although this disclosure describes and illustrates an example method for encoding a plurality of pixels based on delta encoding that utilizes a base value, symbol mask, symbol width, and sequence of symbols, this disclosure contemplates any suitable method for encoding a plurality of pixels based on delta encoding that utilizes a base value, symbol mask, symbol width, and sequence of symbols including any suitable steps, which may include all, some, or none of the steps of the method of FIG. 23, where appropriate. Furthermore, although this disclosure describes and illustrates particular components, devices, or systems carrying out particular steps of the method of FIG. 23, this disclosure contemplates any suitable combination of any suitable components, devices, or systems carrying out any suitable steps of the method of FIG. 23.

Figure 24:
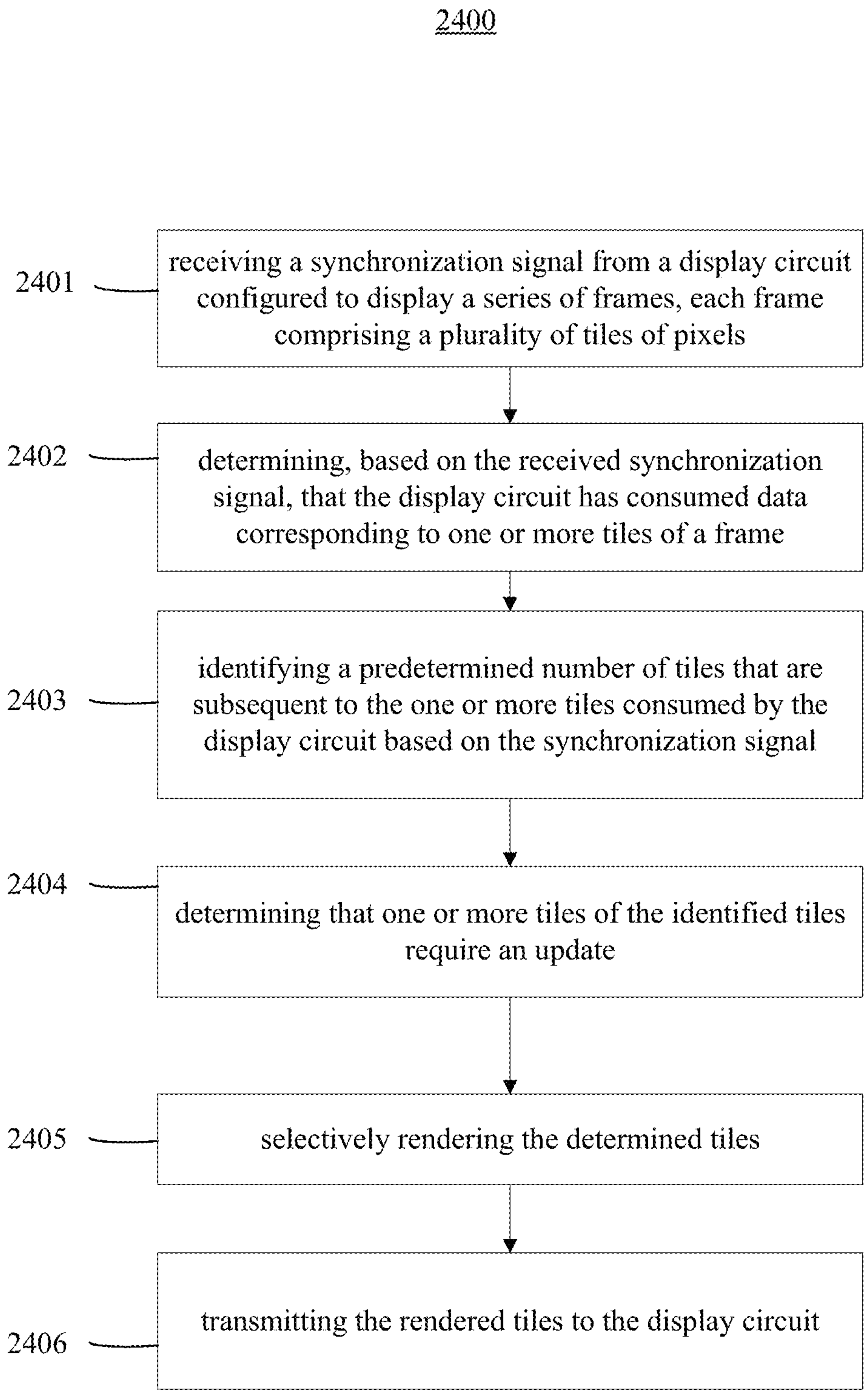
FIG. 24 illustrates an example method for selectively rendering a series of frames utilizing a graphics engine utilizing a temporary buffer where rendered tiles are transmitted to a display unit directly once the tiles are rendered.

FIG. 24 illustrates an example method 2400 for selectively rendering a series of frames utilizing a graphics engine utilizing a temporary buffer where rendered tiles are transmitted to a display unit directly once the tiles are rendered. The method may begin at step 2401 by receiving a synchronization signal from a display circuit configured to display a series of frames, each frame comprising a plurality of tiles of pixels. At step 2402, the method may continue by determining, based on the received synchronization signal, that the display circuit has consumed data corresponding to one or more tiles of a frame. At step 2403, the method may continue by identifying a predetermined number of tiles that are subsequent to the one or more tiles consumed by the display circuit based on the synchronization signal. At step 2404, the method may continue by determining that one or more tiles of the identified tiles require an update. At step 2405, the method may continue by selectively rendering the determined tiles. At step 2406, the method may continue by transmitting the rendered tiles to the display circuit. Particular embodiments may repeat one or more steps of the method of FIG. 24, where appropriate. Although this disclosure describes and illustrates particular steps of the method of FIG. 24 as occurring in a particular order, this disclosure contemplates any suitable steps of the method of FIG. 24 occurring in any suitable order. Moreover, although this disclosure describes and illustrates an example method for selectively rendering a series of frames utilizing a graphics engine utilizing a temporary buffer where rendered tiles are transmitted to a display unit directly once the tiles are rendered, this disclosure contemplates any suitable method for selectively rendering a series of frames utilizing a graphics engine utilizing a temporary buffer where rendered tiles are transmitted to a display unit directly once the tiles are rendered including any suitable steps, which may include all, some, or none of the steps of the method of FIG. 24, where appropriate. Furthermore, although this disclosure describes and illustrates particular components, devices, or systems carrying out particular steps of the method of FIG. 24, this disclosure contemplates any suitable combination of any suitable components, devices, or systems carrying out any suitable steps of the method of FIG. 24.

Figure 25:
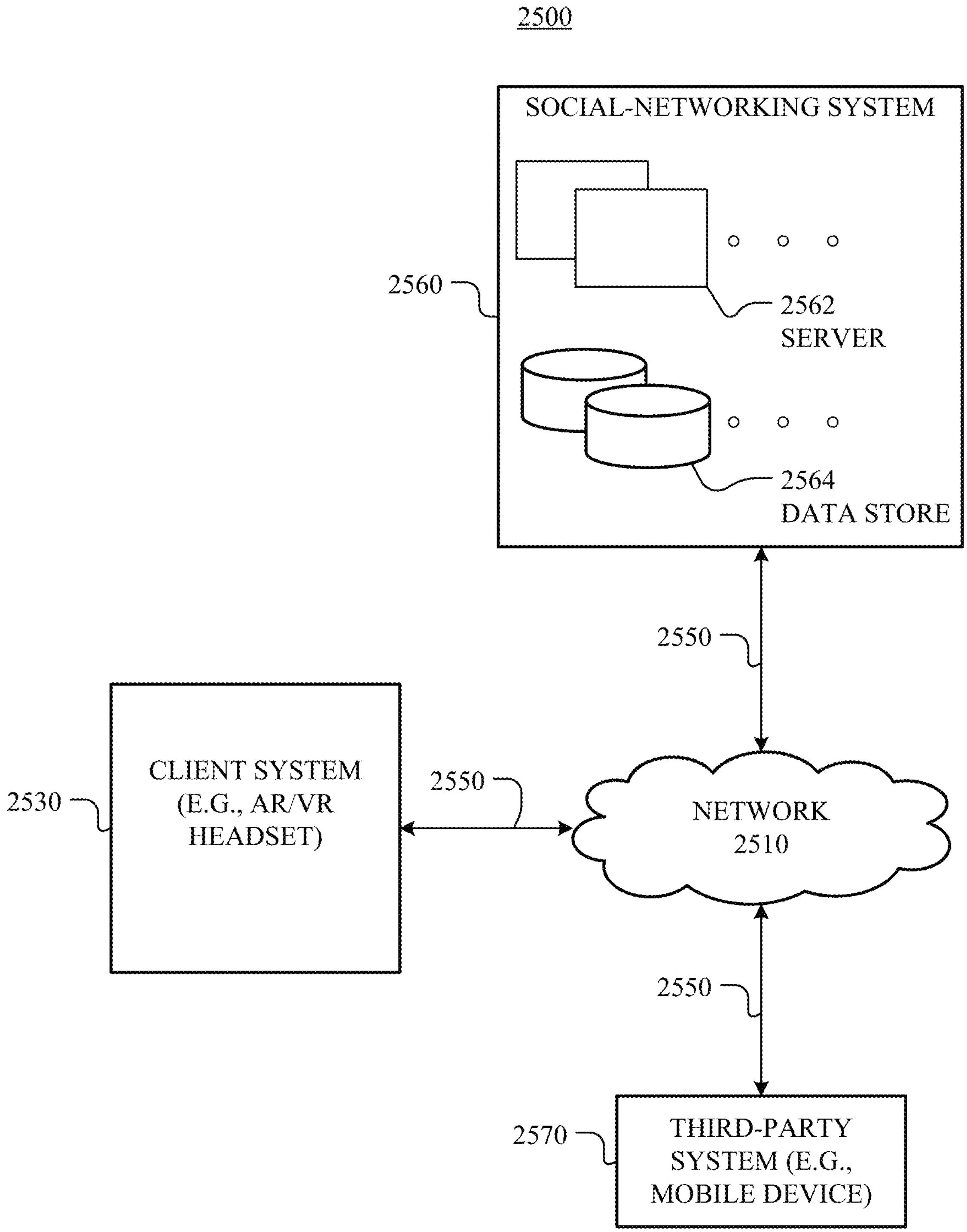
FIG. 25 illustrates an example network environment.

FIG. 25 illustrates an example network environment 2500 associated with a social-networking system. Network environment 2500 includes a client system 2530, a social-networking system 2560, and a third-party system 2570 connected to each other by a network 2510. Although FIG. 25 illustrates a particular arrangement of client system 2530, social-networking system 2560, third-party system 2570, and network 2510, this disclosure contemplates any suitable arrangement of client system 2530, social-networking system 2560, third-party system 2570, and network 2510. As an example and not by way of limitation, two or more of client system 2530, social-networking system 2560, and third-party system 2570 may be connected to each other directly, bypassing network 2510. As another example, two or more of client system 2530, social-networking system 2560, and third-party system 2570 may be physically or logically co-located with each other in whole or in part. For example, an AR/VR headset 2530 may be connected to a local computer or mobile computing device 2570 via short-range wireless communication (e.g., Bluetooth). Moreover, although FIG. 25 illustrates a particular number of client systems 2530, social-networking systems 2560, third-party systems 2570, and networks 2510, this disclosure contemplates any suitable number of client systems 2530, social-networking systems 2560, third-party systems 2570, and networks 2510. As an example and not by way of limitation, network environment 2500 may include multiple client system 2530, social-networking systems 2560, third-party systems 2570, and networks 2510.

This disclosure contemplates any suitable network 2510. As an example and not by way of limitation, one or more portions of network 2510 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 2510 may include one or more networks 2510.

Links 2550 may connect client system 2530, social-networking system 2560, and third-party system 2570 to communication network 2510 or to each other. This disclosure contemplates any suitable links 2550. In particular embodiments, one or more links 2550 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 2550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 2550, or a combination of two or more such links 2550. Links 2550 need not necessarily be the same throughout network environment 2500. One or more first links 2550 may differ in one or more respects from one or more second links 2550.

In particular embodiments, client system 2530 may be an electronic device including hardware, software, or embedded logic components or a combination of two or more such components and capable of carrying out the appropriate functionalities implemented or supported by client system 2530. As an example and not by way of limitation, a client system 2530 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 2530. A client system 2530 may enable a network user at client system 2530 to access network 2510. A client system 2530 may enable its user to communicate with other users at other client systems 2530.

In particular embodiments, social-networking system 2560 may be a network-addressable computing system that can host an online social network. Social-networking system 2560 may generate, store, receive, and send social-networking data, such as, for example, user-profile data, concept-profile data, social-graph information, or other suitable data related to the online social network. Social-networking system 2560 may be accessed by the other components of network environment 2500 either directly or via network 2510. As an example and not by way of limitation, client system 2530 may access social-networking system 2560 using a web browser, or a native application associated with social-networking system 2560 (e.g., a mobile social-networking application, a messaging application, another suitable application, or any combination thereof) either directly or via network 2510. In particular embodiments, social-networking system 2560 may include one or more servers 2562. Each server 2562 may be a unitary server or a distributed server spanning multiple computers or multiple datacenters. Servers 2562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 2562 may include hardware, software, or embedded logic components or a combination of two or more such components for carrying out the appropriate functionalities implemented or supported by server 2562. In particular embodiments, social-networking system 2560 may include one or more data stores 2564. Data stores 2564 may be used to store various types of information. In particular embodiments, the information stored in data stores 2564 may be organized according to specific data structures. In particular embodiments, each data store 2564 may be a relational, columnar, correlation, or other suitable database. Although this disclosure describes or illustrates particular types of databases, this disclosure contemplates any suitable types of databases. Particular embodiments may provide interfaces that enable a client system 2530, a social-networking system 2560, or a third-party system 2570 to manage, retrieve, modify, add, or delete, the information stored in data store 2564.

In particular embodiments, social-networking system 2560 may store one or more social graphs in one or more data stores 2564. In particular embodiments, a social graph may include multiple nodes-which may include multiple user nodes (each corresponding to a particular user) or multiple concept nodes (each corresponding to a particular concept)—and multiple edges connecting the nodes. Social-networking system 2560 may provide users of the online social network the ability to communicate and interact with other users. In particular embodiments, users may join the online social network via social-networking system 2560 and then add connections (e.g., relationships) to a number of other users of social-networking system 2560 to whom they want to be connected. Herein, the term "friend" may refer to any other user of social-networking system 2560 with whom a user has formed a connection, association, or relationship via social-networking system 2560.

In particular embodiments, social-networking system 2560 may provide users with the ability to take actions on various types of items or objects, supported by social-networking system 2560. As an example and not by way of limitation, the items and objects may include groups or social networks to which users of social-networking system 2560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 2560 or by an external system of third-party system 2570, which is separate from social-networking system 2560 and coupled to social-networking system 2560 via a network 2510.

In particular embodiments, social-networking system 2560 may be capable of linking a variety of entities. As an example and not by way of limitation, social-networking system 2560 may enable users to interact with each other as well as receive content from third-party systems 2570 or other entities, or to allow users to interact with these entities through an application programming interfaces (API) or other communication channels.

In particular embodiments, a third-party system 2570 may include a local computing device that is communicatively coupled to the client system 2530. For example, if the client system 2530 is an AR/VR headset, the third-party system 2570 may be a local laptop configured to perform the necessary graphics rendering and provide the rendered results to the AR/VR headset 2530 for subsequent processing and/or display. In particular embodiments, the third-party system 2570 may execute software associated with the client system 2530 (e.g., a rendering engine). The third-party system 2570 may generate sample datasets with sparse pixel information of video frames and send the sparse data to the client system 2530. The client system 2530 may then generate frames reconstructed from the sample datasets.

In particular embodiments, the third-party system 2570 may also include one or more types of servers, one or more data stores, one or more interfaces, including but not limited to APIs, one or more web services, one or more content sources, one or more networks, or any other suitable components, e.g., that servers may communicate with. A third-party system 2570 may be operated by a different entity from an entity operating social-networking system 2560. In particular embodiments, however, social-networking system 2560 and third-party systems 2570 may operate in conjunction with each other to provide social-networking services to users of social-networking system 2560 or third-party systems 2570. In this sense, social-networking system 2560 may provide a platform, or backbone, which other systems, such as third-party systems 2570, may use to provide social-networking services and functionality to users across the Internet.

In particular embodiments, a third-party system 2570 may include a third-party content object provider (e.g., including sparse sample datasets described herein). A third-party content object provider may include one or more sources of content objects, which may be communicated to a client system 2530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 2560 also includes user-generated content objects, which may enhance a user's interactions with social-networking system 2560. User-generated content may include anything a user can add, upload, send, or "post" to social-networking system 2560. As an example and not by way of limitation, a user communicates posts to social-networking system 2560 from a client system 2530. Posts may include data such as status updates or other textual data, location information, photos, videos, links, music or other similar data or media. Content may also be added to social-networking system 2560 by a third-party through a "communication channel," such as a newsfeed or stream.

In particular embodiments, social-networking system 2560 may include a variety of servers, sub-systems, programs, modules, logs, and data stores. In particular embodiments, social-networking system 2560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 2560 may also include suitable components such as network interfaces, security mechanisms, load balancers, failover servers, management-and-network-operations consoles, other suitable components, or any suitable combination thereof. In particular embodiments, social-networking system 2560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 2560 to one or more client systems 2530 or one or more third-party system 2570 via network 2510. The web server may include a mail server or other messaging functionality for receiving and routing messages between social-networking system 2560 and one or more client systems 2530. An API-request server may allow a third-party system 2570 to access information from social-networking system 2560 by calling one or more APIs. An action logger may be used to receive communications from a web server about a user's actions on or off social-networking system 2560. In conjunction with the action log, a third-party-content-object log may be maintained of user exposures to third-party-content objects. A notification controller may provide information regarding content objects to a client system 2530. Information may be pushed to a client system 2530 as notifications, or information may be pulled from client system 2530 responsive to a request received from client system 2530. Authorization servers may be used to enforce one or more privacy settings of the users of social-networking system 2560. A privacy setting of a user determines how particular information associated with a user can be shared. The authorization server may allow users to opt in to or opt out of having their actions logged by social-networking system 2560 or shared with other systems (e.g., third-party system 2570), such as, for example, by setting appropriate privacy settings. Third-party-content-object stores may be used to store content objects received from third parties, such as a third-party system 2570. Location stores may be used for storing location information received from client systems 2530 associated with users. Advertisement-pricing modules may combine social information, the current time, location information, or other suitable information to provide relevant advertisements, in the form of notifications, to a user.

Figure 26:
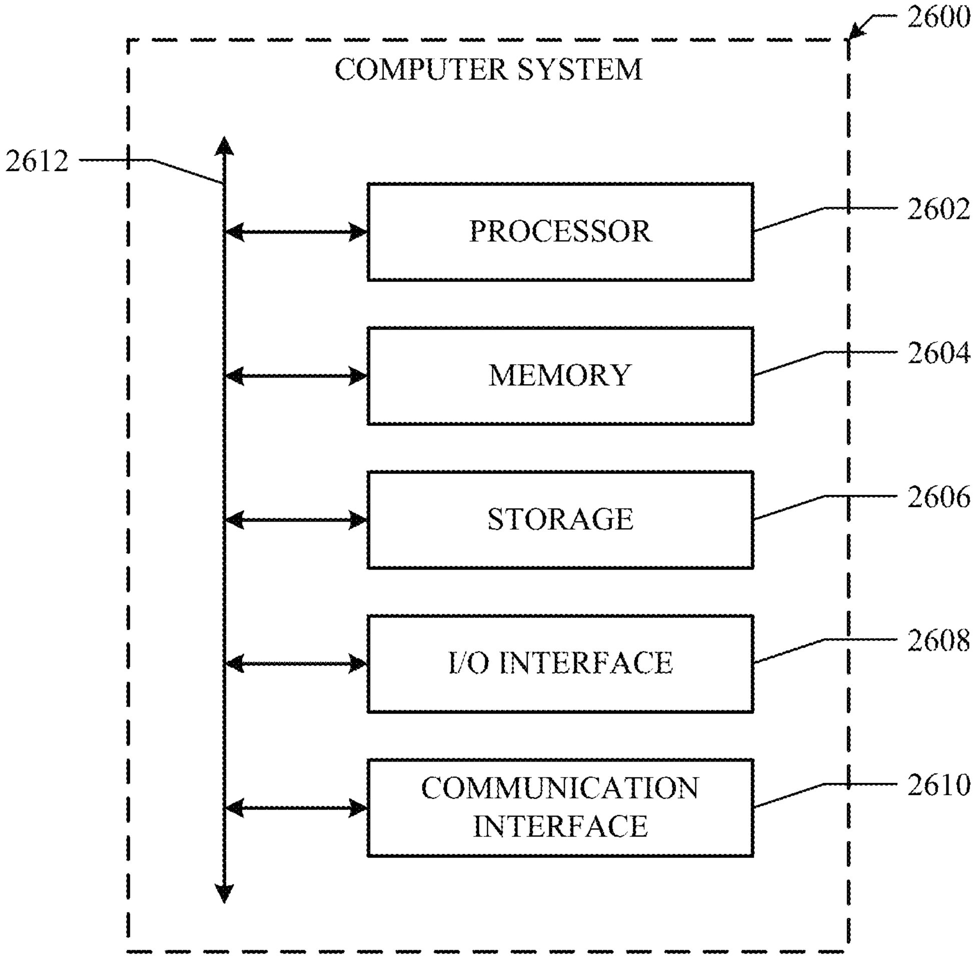
FIG. 26 illustrates an example computer system.

FIG. 26 illustrates an example computer system 2600. In particular embodiments, one or more computer systems 2600 perform one or more steps of one or more methods described or illustrated herein. In particular embodiments, one or more computer systems 2600 provide functionality described or illustrated herein. In particular embodiments, software running on one or more computer systems 2600 performs one or more steps of one or more methods described or illustrated herein or provides functionality described or illustrated herein. Particular embodiments include one or more portions of one or more computer systems 2600. Herein, reference to a computer system may encompass a computing device, and vice versa, where appropriate. Moreover, reference to a computer system may encompass one or more computer systems, where appropriate.

This disclosure contemplates any suitable number of computer systems 2600. This disclosure contemplates computer system 2600 taking any suitable physical form. As example and not by way of limitation, computer system 2600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2600 may include one or more computer systems 2600; be unitary or distributed; span multiple locations; span multiple machines; span multiple data centers; or reside in a cloud, which may include one or more cloud components in one or more networks. Where appropriate, one or more computer systems 2600 may perform without substantial spatial or temporal limitation one or more steps of one or more methods described or illustrated herein. As an example and not by way of limitation, one or more computer systems 2600 may perform in real time or in batch mode one or more steps of one or more methods described or illustrated herein. One or more computer systems 2600 may perform at different times or at different locations one or more steps of one or more methods described or illustrated herein, where appropriate.

In particular embodiments, computer system 2600 includes a processor 2602, memory 2604, storage 2606, an input/output (I/O) interface 2608, a communication interface 2610, and a bus 2612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage 2606; decode and execute them; and then write one or more results to an internal register, an internal cache, memory 2604, or storage 2606. In particular embodiments, processor 2602 may include one or more internal caches for data, instructions, or addresses. This disclosure contemplates processor 2602 including any suitable number of any suitable internal caches, where appropriate. As an example and not by way of limitation, processor 2602 may include one or more instruction caches, one or more data caches, and one or more translation lookaside buffers (TLBs). Instructions in the instruction caches may be copies of instructions in memory 2604 or storage 2606, and the instruction caches may speed up retrieval of those instructions by processor 2602. Data in the data caches may be copies of data in memory 2604 or storage 2606 for instructions executing at processor 2602 to operate on; the results of previous instructions executed at processor 2602 for access by subsequent instructions executing at processor 2602 or for writing to memory 2604 or storage 2606; or other suitable data. The data caches may speed up read or write operations by processor 2602. The TLBs may speed up virtual-address translation for processor 2602. In particular embodiments, processor 2602 may include one or more internal registers for data, instructions, or addresses. This disclosure contemplates processor 2602 including any suitable number of any suitable internal registers, where appropriate. Where appropriate, processor 2602 may include one or more arithmetic logic units (ALUs); be a multi-core processor; or include one or more processors 2602. Although this disclosure describes and illustrates a particular processor, this disclosure contemplates any suitable processor.

In particular embodiments, memory 2604 includes main memory for storing instructions for processor 2602 to execute or data for processor 2602 to operate on. As an example and not by way of limitation, computer system 2600 may load instructions from storage 2606 or another source (such as, for example, another computer system 2600) to memory 2604. Processor 2602 may then load the instructions from memory 2604 to an internal register or internal cache. To execute the instructions, processor 2602 may retrieve the instructions from the internal register or internal cache and decode them. During or after execution of the instructions, processor 2602 may write one or more results (which may be intermediate or final results) to the internal register or internal cache. Processor 2602 may then write one or more of those results to memory 2604. In particular embodiments, processor 2602 executes only instructions in one or more internal registers or internal caches or in memory 2604 (as opposed to storage 2606 or elsewhere) and operates only on data in one or more internal registers or internal caches or in memory 2604 (as opposed to storage 2606 or elsewhere). One or more memory buses (which may each include an address bus and a data bus) may couple processor 2602 to memory 2604. Bus 2612 may include one or more memory buses, as described below. In particular embodiments, one or more memory management units (MMUs) reside between processor 2602 and memory 2604 and facilitate accesses to memory 2604 requested by processor 2602. In particular embodiments, memory 2604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2604 may include one or more memories 2604, where appropriate. Although this disclosure describes and illustrates particular memory, this disclosure contemplates any suitable memory.

In particular embodiments, storage 2606 includes mass storage for data or instructions. As an example and not by way of limitation, storage 2606 may include a hard disk drive (HDD), a floppy disk drive, flash memory, an optical disc, a magneto-optical disc, magnetic tape, or a Universal Serial Bus (USB) drive or a combination of two or more of these. Storage 2606 may include removable or non-removable (or fixed) media, where appropriate. Storage 2606 may be internal or external to computer system 2600, where appropriate. In particular embodiments, storage 2606 is non-volatile, solid-state memory. In particular embodiments, storage 2606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2606 taking any suitable physical form. Storage 2606 may include one or more storage control units facilitating communication between processor 2602 and storage 2606, where appropriate. Where appropriate, storage 2606 may include one or more storages 2606. Although this disclosure describes and illustrates particular storage, this disclosure contemplates any suitable storage.

In particular embodiments, I/O interface 2608 includes hardware, software, or both, providing one or more interfaces for communication between computer system 2600 and one or more I/O devices. Computer system 2600 may include one or more of these I/O devices, where appropriate. One or more of these I/O devices may enable communication between a person and computer system 2600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2608 for them. Where appropriate, I/O interface 2608 may include one or more device or software drivers enabling processor 2602 to drive one or more of these I/O devices. I/O interface 2608 may include one or more I/O interfaces 2608, where appropriate. Although this disclosure describes and illustrates a particular I/O interface, this disclosure contemplates any suitable I/O interface.

In particular embodiments, communication interface 2610 includes hardware, software, or both providing one or more interfaces for communication (such as, for example, packet-based communication) between computer system 2600 and one or more other computer systems 2600 or one or more networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2610 for it. As an example and not by way of limitation, computer system 2600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2600 may include any suitable communication interface 2610 for any of these networks, where appropriate. Communication interface 2610 may include one or more communication interfaces 2610, where appropriate. Although this disclosure describes and illustrates a particular communication interface, this disclosure contemplates any suitable communication interface.

In particular embodiments, bus 2612 includes hardware, software, or both coupling components of computer system 2600 to each other. As an example and not by way of limitation, bus 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2612 may include one or more buses 2612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A non-transitory computer-readable storage medium storing one or more programs configured for execution by a display system, the one or more programs including instructions for:

receiving, by a graphics engine configured to render a series of frames for display by a display circuit without using a frame buffer, a synchronization signal from the display circuit, wherein the display circuit is configured to cause display of a respective frame of the series of frames and the respective frame is associated with a plurality of tiles;

determining, based on the received synchronization signal, that the display circuit has consumed data from a display buffer on the display circuit, wherein the data corresponds to one or more of the plurality of tiles associated with the respective frame of the series of frames;

identifying, based on the synchronization signal, a predetermined number of the plurality of tiles that are subsequent to the one or more tiles consumed by the display circuit; and causing the graphics engine to render data associated with the predetermined number of the plurality of tiles.

2. The non-transitory computer-readable storage medium of claim 1, wherein the instructions for identifying the predetermined number of the plurality of tiles that are subsequent to the one or more tiles consumed by the display circuit are further based on determining a speed at which the display circuit consumes data from the display buffer of the display circuit.

3. The non-transitory computer-readable storage medium of claim 1, the one or more programs further include instructions for:

determining that the received synchronization signal is a horizontal synchronization (H-sync) signal.

4. The non-transitory computer-readable storage medium of claim 3, wherein the one or more programs further include instructions for:

outputting, to the display buffer on the display circuit, the rendered data associated with the predetermined number of the plurality of tiles in a row-by-row manner.

5. The non-transitory computer-readable storage medium of claim 1, wherein the one or more programs further include instructions for:

determining that the received synchronization signal is a vertical synchronization (V-sync) signal.

6. The non-transitory computer-readable storage medium of claim 5, wherein the predetermined number of the plurality of tiles are associated with a subsequent frame of the series of frames to be rendered after the respective frame of the series of frames.

7. The non-transitory computer-readable storage medium of claim 6, wherein the one or more programs further include instructions for:

outputting, to the display buffer on the display circuit, the rendered data associated with the predetermined number of the plurality of tiles.

8. The non-transitory computer-readable storage medium of claim 1, wherein the display buffer has capacity for storing data corresponding to less than a full-sized frame.

9. The non-transitory computer-readable storage medium of claim 8, wherein the capacity corresponds to two tiles of the plurality of tiles.

10. A system including a graphics engine in communication with a display circuit, the graphics engine configured to:

render, without using a frame buffer, a series of frames for display by the display circuit;

receive, from the display circuit, a synchronization signal associated with a respective frame of the series of frames, wherein the respective frame is associated with a plurality of tiles;

determine, based on the synchronization signal, that the display circuit has consumed data from a display buffer on the display circuit, wherein the data corresponds to one or more of the plurality of tiles associated with the respective frame of the series of frames;

identify, based on the synchronization signal, a predetermined number of the plurality of tiles that are subsequent to the one or more tiles consumed by the display circuit; and render data associated with the predetermined number of the plurality of tiles.

11. The system of claim 10, wherein identifying the predetermined number of the plurality of tiles that are subsequent to the one or more tiles consumed by the display circuit is further based on determining a speed at which the display circuit consumes data from the display buffer of the display circuit.

12. The system of claim 10, wherein the graphics engine is further configured to:

determine that the received synchronization signal is a horizontal synchronization (H-sync) signal.

13. The system of claim 12, wherein the graphics engine is further configured to:

output, to the display buffer on the display circuit, the rendered data associated with the predetermined number of the plurality of tiles in a row-by-row manner.

14. The system of claim 10, wherein the graphics engine is further configured to:

determine that the received synchronization signal is a vertical synchronization (V-sync) signal.

15. The system of claim 14, wherein the predetermined number of the plurality of tiles are associated with a subsequent frame of the series of frames to be rendered after the respective frame of the series of frames.

16. The system of claim 15, wherein the graphics engine is further configured to:

output, to the display buffer on the display circuit, the rendered data associated with the predetermined number of the plurality of tiles.

17. The system of claim 10, wherein the display buffer has capacity for storing data corresponding to less than a full-sized frame.

18. An integrated circuit comprising a graphics engine configured to:

render, without using a frame buffer, a series of frames for display by a display circuit;

receive, from the display circuit, a synchronization signal associated with a respective frame of the series of frames, wherein the respective frame is associated with a plurality of tiles;

determine, based on the synchronization signal, that the display circuit has consumed data from a display buffer on the display circuit, wherein the data corresponds to one or more of the plurality of tiles associated with the respective frame of the series of frames;

identify, based on the synchronization signal, a predetermined number of the plurality of tiles that are subsequent to the one or more tiles consumed by the display circuit; and render data associated with the predetermined number of the plurality of tiles.

19. The integrated circuit of claim 18, wherein the graphics engine is further configured to:

determine that the received synchronization signal is a horizontal synchronization (H-sync) or vertical synchronization (V-sync) signal; and output, to the display buffer on the display circuit, the rendered data associated with the predetermined number of the plurality of tiles.

20. The integrated circuit of claim 18, wherein the display buffer has capacity for storing data corresponding to less than a full-sized frame.

* * * * *